United States Patent
Ramanathan et al.

(10) Patent No.: US 8,837,704 B2
(45) Date of Patent: Sep. 16, 2014

(54) CLIENT CONTROLLED DYNAMIC CALL FORWARDING

(75) Inventors: Rajesh Ramanathan, Redmond, WA (US); Amritansh Raghav, Seattle, WA (US); Eran Shtiegman, Redmond, WA (US); Nikhil Bobde, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1746 days.

(21) Appl. No.: 11/513,518

(22) Filed: Aug. 31, 2006

(65) Prior Publication Data

US 2008/0075261 A1 Mar. 27, 2008

(51) Int. Cl.
*H04M 7/00* (2006.01)
*H04M 3/42* (2006.01)
*H04L 29/06* (2006.01)
*H04M 3/54* (2006.01)

(52) U.S. Cl.
CPC .............. *H04M 3/54* (2013.01); *H04L 65/1096* (2013.01); *H04L 65/1006* (2013.01); *H04M 3/42153* (2013.01)
USPC ............ 379/220.01; 379/201.01; 379/201.02; 379/201.03; 379/211.01; 379/211.02

(58) Field of Classification Search
USPC .................. 379/220.01, 242, 201.03, 212.01, 379/211.01–211.02, 142.07, 157, 201.01, 379/201.02, 213.01, 215.01, 70, 88.19, 379/93.35, 207.02, 210.02, 210.03, 214.01; 455/518, 414.1, 417, 432.3; 370/389, 370/493, 356
See application file for complete search history.

(56) References Cited

U.S. PATENT DOCUMENTS

| | | | | |
|---|---|---|---|---|
| 6,148,074 | A  * | 11/2000 | Miloslavsky et al. | ......... 379/242 |
| 6,237,041 | B1 | 5/2001 | Håål et al. | |
| 6,438,114 | B1 | 8/2002 | Womack et al. | |
| 6,678,735 | B1 | 1/2004 | Orton et al. | |
| 6,937,597 | B1 * | 8/2005 | Rosenberg et al. | ........... 370/356 |

(Continued)

FOREIGN PATENT DOCUMENTS

| | | |
|---|---|---|
| EP | 1093281 A2 | 4/2001 |
| JP | 2000-217132 | 4/2000 |
| JP | 2006-287904 | 10/2006 |

OTHER PUBLICATIONS

International Search Report, PCT/US2007/076027, Jan. 22, 2008, pp. 1-11.

(Continued)

*Primary Examiner* — Khai N Nguyen
(74) *Attorney, Agent, or Firm* — Andrew Smith; Peter Taylor; Micky Minhas

(57) ABSTRACT

A client-side signaling mechanism that allows a client to control how a telephone call is handled on a call server. The client user can create call routing rules on the client device using a client control component that manages session protocol messages. Once created, the call routing rule(s) created on the client are transmitted to the call server where a call routing component of the call server processes the rule(s) for a call related to the client. When the server receives the rule(s) and determines that the rule(s) are related to an existing call (incoming or currently in-process), the server halts current normal server rules processing for that call and executes the client-created rule(s). In one example, SIP session messages are employed for client control of server-side call forwarding.

17 Claims, 18 Drawing Sheets

(56) References Cited

U.S. PATENT DOCUMENTS

| | | | |
|---|---|---|---|
| 7,020,707 B2 | 3/2006 | Sternagle | |
| 7,050,861 B1 | 5/2006 | Lauzon et al. | |
| 7,058,033 B1 | 6/2006 | Dantu et al. | |
| 7,203,294 B2* | 4/2007 | Carnazza et al. | 379/142.07 |
| 7,272,382 B2* | 9/2007 | Servi et al. | 455/411 |
| 7,319,744 B1* | 1/2008 | Arnold et al. | 379/201.03 |
| 7,869,798 B2 | 1/2011 | Perrella et al. | |
| 7,957,517 B2* | 6/2011 | Ricciardi et al. | 379/212.01 |
| 2002/0141404 A1 | 10/2002 | Wengrovitz | |
| 2003/0072330 A1 | 4/2003 | Yang et al. | |
| 2003/0215078 A1* | 11/2003 | Brahm et al. | 379/211.02 |
| 2004/0028208 A1 | 2/2004 | Carnazza et al. | |
| 2004/0174971 A1* | 9/2004 | Guan | 379/201.02 |
| 2004/0229600 A1* | 11/2004 | Saez et al. | 455/417 |
| 2005/0003830 A1* | 1/2005 | Campbell | 455/456.1 |
| 2005/0025130 A1 | 2/2005 | Hoffmann | |
| 2005/0041787 A1* | 2/2005 | Casey et al. | 379/88.18 |
| 2005/0044188 A1 | 2/2005 | Nakazawa et al. | |
| 2005/0100157 A1 | 5/2005 | Gray et al. | |
| 2005/0117714 A1 | 6/2005 | Chingon et al. | |
| 2005/0175168 A1 | 8/2005 | Summe et al. | |
| 2005/0180436 A1 | 8/2005 | Hsu | |
| 2005/0238157 A1* | 10/2005 | Shaffer et al. | 379/211.01 |
| 2005/0283486 A1* | 12/2005 | Lauterbach et al. | 707/100 |
| 2006/0079215 A1 | 4/2006 | Perrella et al. | |
| 2006/0098624 A1 | 5/2006 | Morgan et al. | |
| 2006/0101098 A1* | 5/2006 | Morgan et al. | 707/204 |
| 2006/0128411 A1* | 6/2006 | Turcanu | 455/518 |
| 2006/0133367 A1* | 6/2006 | Tasker | 370/389 |
| 2006/0193460 A1* | 8/2006 | Cadiz et al. | 379/211.02 |
| 2007/0140458 A1* | 6/2007 | Daniell et al. | 379/211.02 |
| 2007/0287438 A1* | 12/2007 | Hansen et al. | 455/417 |

OTHER PUBLICATIONS

Supplementary European Search Report, mailed Mar. 22, 2010, 7 pages.

Kozik et al., "On Opening PSTN to Enhanced Voice/Data Services—The PINT Protocol Solution", Date: 2000, http://www.lucent.com/minds/techjournal/pdf/jul-sep2000/paper11.pdf.

Lennox et al., "Implementing Intelligent Network Services with the Session Initiation Protocol", http://www.cs.columbia.edu/IRT/papers/cucs-002-99.pdf.

Rosenberg et al., "SIP for Presence", Date: 1998, http://www.jdrosen.net/papers/ietf_sip_pipr_mar98.pdf.

Schulzrinne et al., "Internet Telephony: architecture and protocols—an IETF perspective", Date: 1999, pp. 237-255, http://www.item.ntnu.no/~thanhvan/doc/SIParticle.pdf.

"Notice of Preliminary Rejection Issued in Korean Republic of (KR) Patent Application No. 10-2009-7003906", Mailed Date: Sep. 30, 2013, Filed Date: Aug. 15, 2007, 6 pages. (MS# 316983.10).

"Notice of Allowance Issued in Korean Republic of (KR) Patent Application No. 10-2009-7003906", Mailed Date: Apr. 28, 2014, Filed Date: Aug. 15, 2007, 3 pages. (MS# 316983.10) (w/o EnglishTranslation).

\* cited by examiner

CLIENT CONTROLLED DYNAMIC CALL FORWARDING

BACKGROUND

The advent of global communications networks such as the Internet has served as a catalyst for the convergence of computing power and services in portable computing devices. Given the advances in storage and computing power of such portable wireless devices, they now are capable of handling many types of disparate data types such as images, voice, video clips, audio data, and textual data, for example. This data is typically utilized separately for specific purposes. Network operators and providers (both cellular as well as non-cellular) have long realized that mobile communications is the next frontier that can provide huge returns. Thus, a cellular customer can now purchase a cell phone that allows access to multimedia that is available on the Internet. In another example, a cell phone user can also message an IP node (another user) on the Internet, and read e-mail from the user's e-mail provider based on the Internet. Similarly, telephony capability for computing devices also provides lucrative opportunities.

In an IP-based client-server telecommunications context (e.g., VoIP—voice over Internet protocol), telephone call processing/forwarding rules have traditionally been implemented server side. This requires the server to have prior knowledge of the rules that have been set by the client. Server-side forwarding has worked in the past because the rules that the client could apply were simple and easy to implement.

In the future, however, there would be many instances where the server would be incapable of understanding or applying call processing rules without the help of additional assistance from the client. This can be especially significant where client deployments and rollouts are much more frequent than server deployments, which is more likely to be the case.

Moreover, it can easily be imagined that users will be able to purchase new client software off the shelf and use it with existing server infrastructures, since client applications are quicker to develop and deploy, and evolve faster than server applications. Thus, existing signaling mechanisms in, for example, SIP (session initiation protocol) are inadequate or undefined to help solve the problem. Another problem with existing signaling protocols is that there is no way for the client to specify to the server that the call should be processed by proxy.

SUMMARY

The following presents a simplified summary in order to provide a basic understanding of some aspects of the disclosed innovation. This summary is not an extensive overview, and it is not intended to identify key/critical elements or to delineate the scope thereof. Its sole purpose is to present some concepts in a simplified form as a prelude to the more detailed description that is presented later.

The disclosed architecture introduces a client-side signaling mechanism that allows a client handset or computing device to control how a telephone call is handled on a call server. The client user is provided with the capability of creating call routing rules on the client based on session protocol messages (e.g., SIP—session initiation protocol) being utilized by the existing session protocol. Once created, the user can cause the call routing rule(s) to be transmitted to the call server where the call server processes the rule(s). When the server receives the rule(s) and determines that the rule(s) are related to an existing call (incoming or currently in-process), the server halts current rules processing for that call and executes the client-side rule(s). The server can be configured to process server-side rules stored on the server for normal processing of client calls. However, once the server receives the client-created rule(s), it dispenses with server-side rules processing for that call and processes the received client rules.

The disclosed innovation can be applied to existing call infrastructures without having to change the server routing rules systems. Additionally, the innovation can be applied without adding additional client-like functionality to the server dynamically when the client logs on. Accordingly, users are able to purchase newer clients off the shelf and use new intelligent call handling features made available on the newer clients while using the existing server infrastructure.

In one exemplary implementation, the session protocol is SIP and the call routing rules developed by the client utilize SIP responses. SIP provisional response messages (1xx) and/or redirect responses (3xx) in the SIP protocol can be leveraged to provide client-side control of server-side call routing. In a more automated implementation, the client user can write a script on the client that when transmitted to the call server contains the call forwarding rules that the server will apply to that particular call. When the proxy server receives such a request, for example, it stops the current call forking and applies the rules that are specified in the 1xx response.

In support thereof, the architecture disclosed and claimed herein comprises a computer-implemented system that facilitates call management. The system includes a call routing component of a call server for routing a call of a client to a destination, and a control component of the client for controlling the routing of the call at the server. The client user creates client-side rules using the control component and transmits the rules to the server-side call routing component for execution for a call related to the client. The call is then routed according to the client-side rules.

Methodologies are described related to capabilities allowing the client to send alternate calling rules while ensuring that the current client continues ringing (or being alerted), to redirect the caller based on an alternate set of call rules, the capability of the call server to apply client-generated call forwarding rules and interrupt any other call forwarding that is already in progress, and the capability of a call-originating client to apply call forwarding rules when the server cannot.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and is intended to include all such aspects and their equivalents. Other advantages and novel features will become apparent from the following detailed description when considered in conjunction with the drawings.

DETAILED DESCRIPTION

Figure 1:
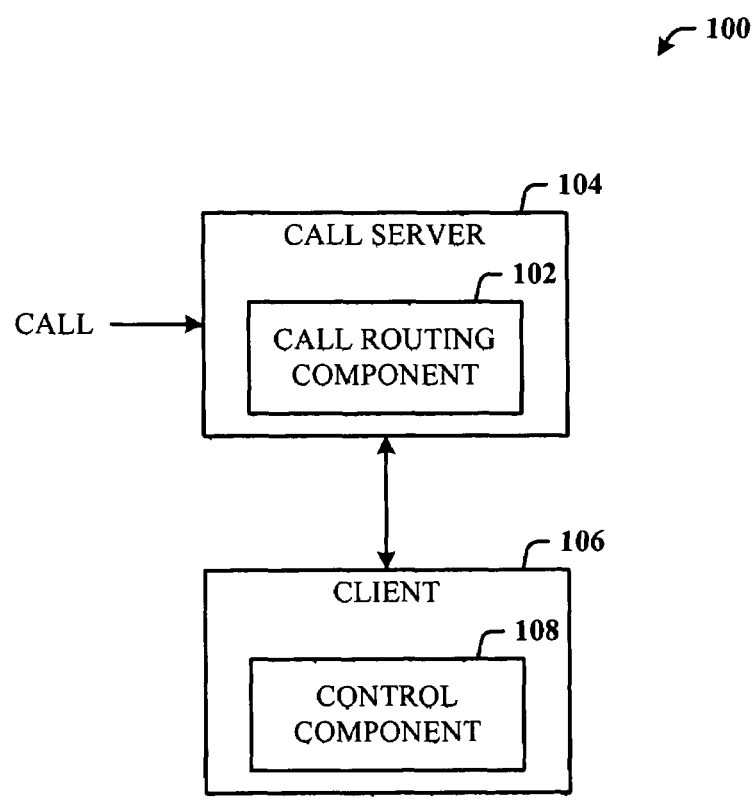
FIG. 1 illustrates a computer-implemented system that facilitates call management in accordance with the disclosed innovation.

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof.

The disclosed architecture introduces a signaling mechanism in, for example, SIP (session initiation protocol), and/or other session protocols that allow a client to control how the call is forwarded on a call server without having to change the existing server call routing rules, or add additional client-like functionality to the server dynamically when the client logs on. As a result, users are able to purchase newer clients off the shelf and use the new intelligent call handling features that can be made available on the clients using the existing server infrastructure that their administrators have deployed. Note that although the description dwells on the use of SIP as the session protocol for communications between the client and the calls server, it is to be understood that the disclosed innovation applies to other session protocols (e.g., H.323) as well.

SIP is a protocol developed by IETF (Internet Engineering Task Force) MMUSIC (Multiparty Multimedia Session Control) Working Group and a proposed standard for initiating, modifying, and terminating an interactive user session that involves multimedia elements such as telephone calls, multimedia conferencing, instant messaging, and other realtime communications on the Internet (e.g., online games and virtual reality). It is one of the leading signaling protocols for VoIP (Voice over IP), along with H.323.

A motivating goal for SIP was to provide a signaling and call setup protocol for IP-based communications that can support a superset of the call processing functions and features present in the public switched telephone network (PSTN). The focus of SIP is call-setup and signaling which features permit familiar telephone-like operations (e.g., dialing a number, causing a phone to ring, hearing ring-back tones or a busy signal).

SIP a peer-to-peer protocol that requires only a very simple core network with intelligence embedded in endpoints (terminating devices built in either hardware or software). In a typical implementation, SIP sessions are simply packet streams of a Realtime Transport Protocol (RTP)—the carrier for the actual voice or video content itself.

Hardware endpoints that provide the look, feel, and shape of a traditional telephone, use SIP and RTP for communications, and further, can use Electronic Numbering (ENUM) to translate existing phone numbers into SIP addresses (based on a URL (uniform resource locator) format). Accordingly, calls to other SIP users can bypass the telephone network even though the service provider might normally act as a gateway to the PSTN network for traditional phone numbers and associated charges.

SIP uses network elements called proxy servers to help route requests to the user's current location, authenticate and authorize users for services, implement provider call-routing policies, and provide features to users. SIP also provides a registration function through a registrar (or user agent server) that allows users to upload their current locations for use by proxy servers.

Referring initially to the drawings, FIG. 1 illustrates a computer-implemented system 100 that facilitates call management in accordance with the disclosed innovation. The system 100 includes a call routing component 102 of a call server 104 (e.g., a proxy server) for routing a call of a client 106 to a destination. The system 100 can also include a control component 108 of the client 106 for controlling the routing of the call at the server 104. In operation, when the call server 104 receives a call directed to the client 106, the call server 104 signals the client 106 that a call is incoming. Whether the client 106 is currently online on a call or offline, the client 106 can cause the call server 104 to handle the incoming call according to client rules that are different than rules currently on the call server 104 for handling calls for the client 106. The client 106 responds to the call server 104 with one or more session messages (e.g., SIP) that indicate to the call server 104 how to route the call.

In one example, a provisional response message of SIP includes a call forwarding rule that is transmitted from the client 106 to the server 104, which when executed by the server 104, routes the call accordingly. In another example, a redirection response message of SIP includes a call forwarding rule that is transmitted from the client to the server, which when executed by the server, routes the call. More specifically, the disclosed architecture leverages the (1xx, where x is 0-9) information (or provisional) response messages, and/or (3xx, where x is 0-9) redirect responses in the SIP protocol. Using at least one or more of these types of responses, a script can be generated at the client 106 and transmitted from the client 106 to the call server 104, the script containing the call forwarding rules that the server 104 applies to that particular call. When the call server 104 receives the script from the client 106, it stops the current call forking for that call and applies the one or more rules in the script that are specified in the 1xx response.

Described in greater detail infra are other capabilities associated with the disclosed architecture. For example, the client 106 can include the capability to send alternate calling rules to the proxy server 104 concurrently with the client 106 processing another call (e.g., continues ringing or being alerted). In another example, the client 106 includes the capability to send a script of rules that redirect processing of the incoming call according to SIP redirection response messages. Moreover, the call server 104 includes the capability to apply the call forwarding rules received from the client 106 and to interrupt any other call forwarding processes that are already in progress that relate to the call. Additionally, no special re-configuration of an existing call or proxy server is needed to apply the call forwarding rules received from a call originating client 106.

Conventionally, for example, the SIP RFC (Request For Comment) 3261 document provides for a 380 Alternate Service response (a Redirection Response under SIP), but leaves its definition or purpose undefined. At least one scenario requires the client to specify the proxy behavior to the server. For example, consider that a user has an incoming call from a caller and wants to direct the caller to his/her mobile number. In this case, the re-routing (e.g., by proxy) has to be done by the LS (location server) proxy, thereby prohibiting use of the existing SIP 302 Moved Temporarily Redirection Response for this purpose.

Figure 2:
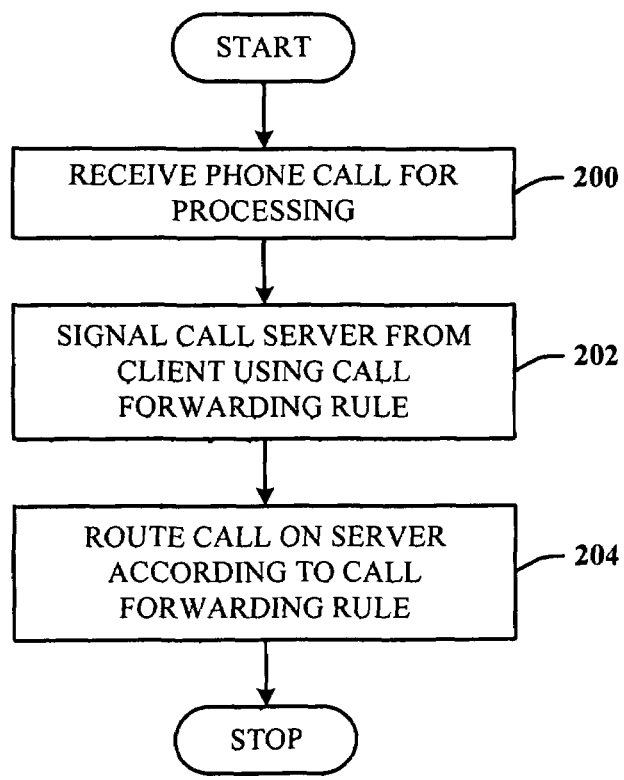
FIG. 2 illustrates a methodology of managing calls from a client.

FIG. 2 illustrates a methodology of managing calls from a client. While, for purposes of simplicity of explanation, the one or more methodologies shown herein, for example, in the form of a flow chart or flow diagram, are shown and described as a series of acts, it is to be understood and appreciated that the subject innovation is not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation.

At 200, a phone call is received at the client for processing. This can be an IP-based phone call (e.g., VoIP) the handling of which is compatible with an IP session protocol (e.g., SIP). In one implementation, the call server signals the client that a call is incoming and will be processed for connection with the client. In another implementation, the call is forwarded to the client, after which the call forwarding is commenced to re-route the call. At 202, the client sends a script of SIP messages (or call rules) to the call server that controls the call server to forward the call according to the client script. At 204, the call server receives and processes the client script to re-route the call.

Figure 3:
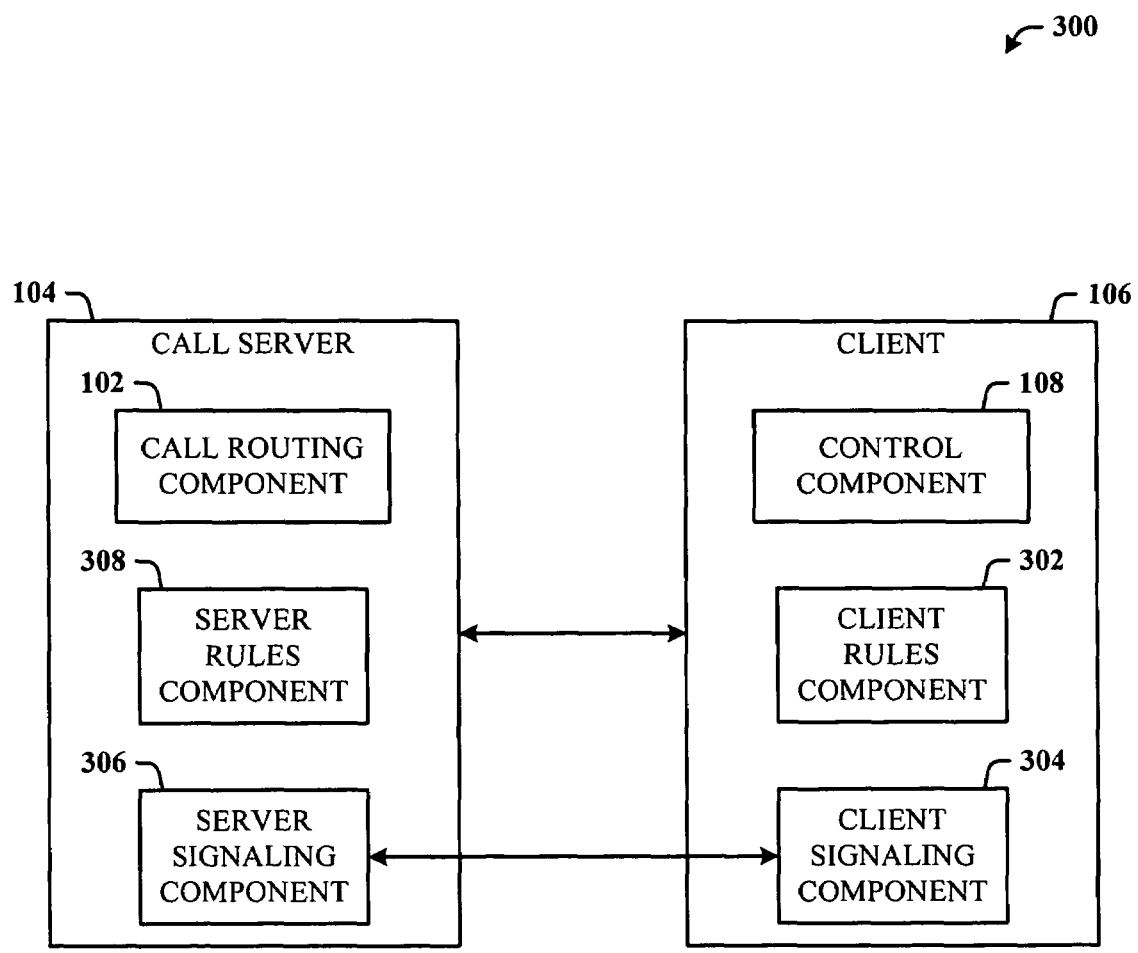
FIG. 3 illustrates a more detailed system that facilitates call management in response to client-based messages.

FIG. 3 illustrates a more detailed system 300 that facilitates call management in response to client-based messages. The system 300 includes the call routing component 102 of the call server 104 for routing a call of the client 106 to a destination, and the control component 108 of the client 106 for generating, transmitting and ultimately controlling the routing of the call at the server 104.

In this implementation, the client 106 also includes a client rules component 302 for developing one or more rules for communication to the server 104 via a client signaling component 304. The client signaling component 304 facilitates utilization of different session protocols, such as SIP. The one or more rules created by the client user through a user interface to the client rules component 302 can be communicated via the client signaling component 304 to a server signaling component 306. In one implementation, the client and server signaling components (304 and 306) process SIP as the session protocol. In another implementation, H.323 is the session protocol. Alternatively, other application layer session protocols can be employed, such as HTTP (hypertext transfer protocol) and FTP (file transport protocol), for example.

As indicated previously, the client rules can be communicated from the client 106 to the server (or proxy server) in the form of a script that is executable by the server 104, and which facilitates the override of one or more server-side rules selected for processing the incoming call. The script, is-received by a server rules component 308 that processes the script and associated rules to route (or forward) the call accordingly.

As described supra, whether the client 106 is currently online on a call or offline when another call comes in, the client 106 can cause the call server 104 to handle the incoming call according to client rules that are different than rules currently on the call server 104 for normal handling of calls for the client 106.

Figure 4:
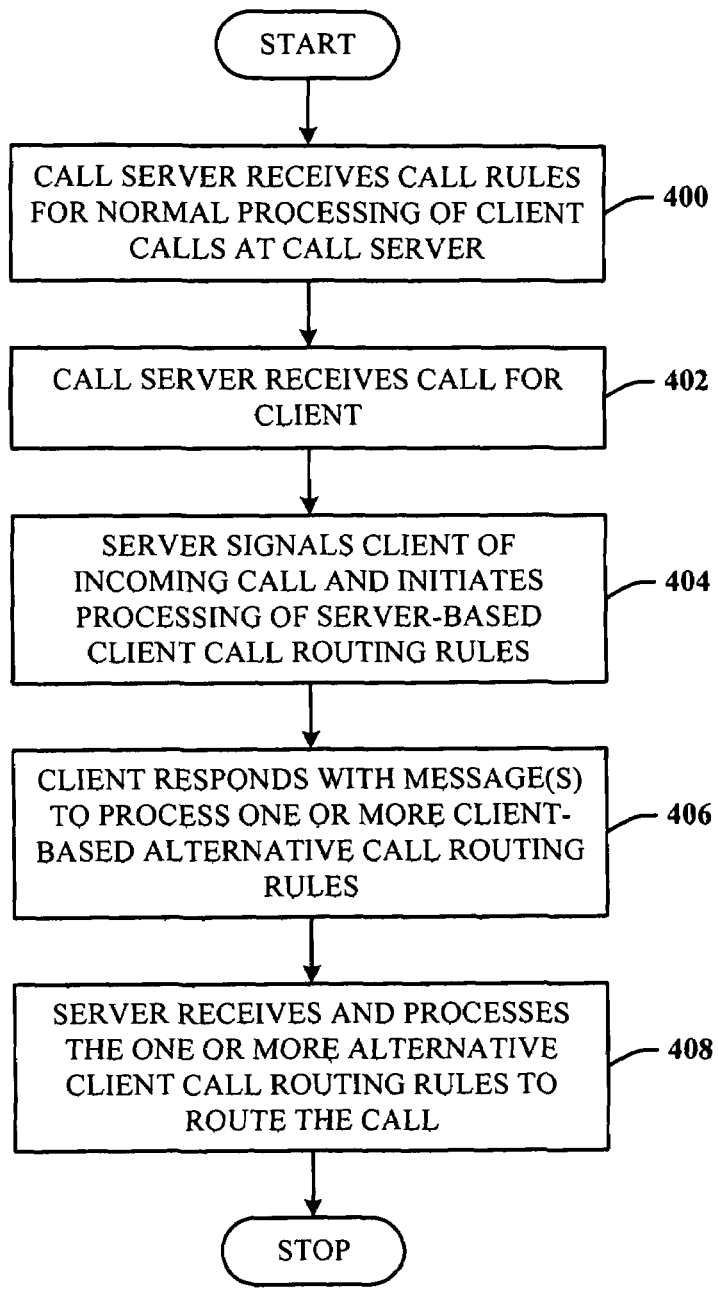
FIG. 4 illustrates a methodology of forwarding calls according to client-side control.

FIG. 4 illustrates a methodology of forwarding calls according to client-side control. At 400, a call server receives call rules for normal processing of client calls at the call server. The call server will process these rules for calls to or from the client until directed otherwise by the client-side control rules. At 402, the call server receives a call for the client. At 404, the server signals the client of an incoming call and initiates processing of the server-side client call routing rules. At 406, the client responds with message(s) to process one or more client-based alternative call routing rules. At 408, the server receives and processes the one or more alternative client call routing rules.

Figure 5:
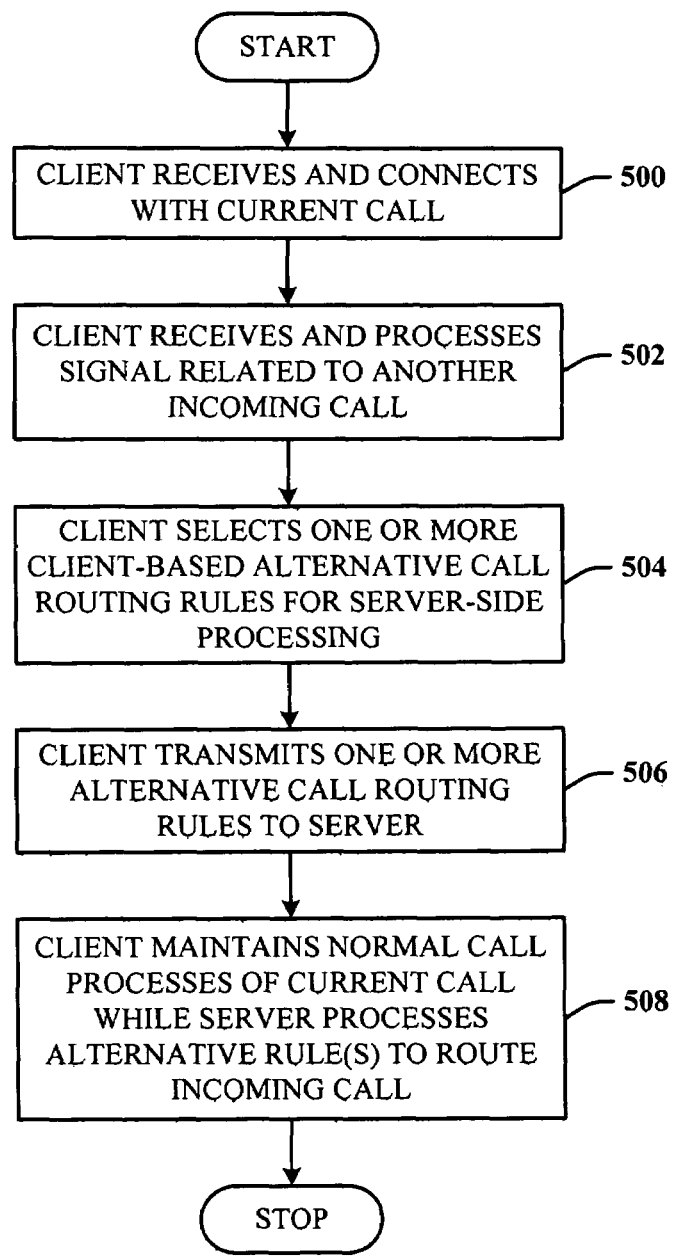
FIG. 5 illustrates a methodology of maintaining client-side processes during client-controlled call forwarding of the call server.

FIG. 5 illustrates a methodology of maintaining client-side processes during client-controlled call forwarding of the call server. At 500, the client receives and connects with a current call. At 502, the client receives and processes a signal related to another incoming call. At 504, the client selects one or more client-based alternative call routing rules for server-side processing. At 506, the client transmits the one or more alternative call routing rules to the server using a session protocol. At 508, the client maintains normal call processes of the current call while the call server processes the one or more alternative rules. In other words, the client processes alerts, notifications (e.g., sounds, chirps, vibrations, ringtones, . . . ), and messages related to the incoming call and other ongoing processes concurrently with controlling the call server such that the user is made aware of another incoming call, in response to which the alternative rules can be communicated to the call server for forwarding the new call. In another example, the current call can be processed according to transmitted client-side rules to connect additional recipients (e.g., call conferencing) to the current call.

Figure 6:
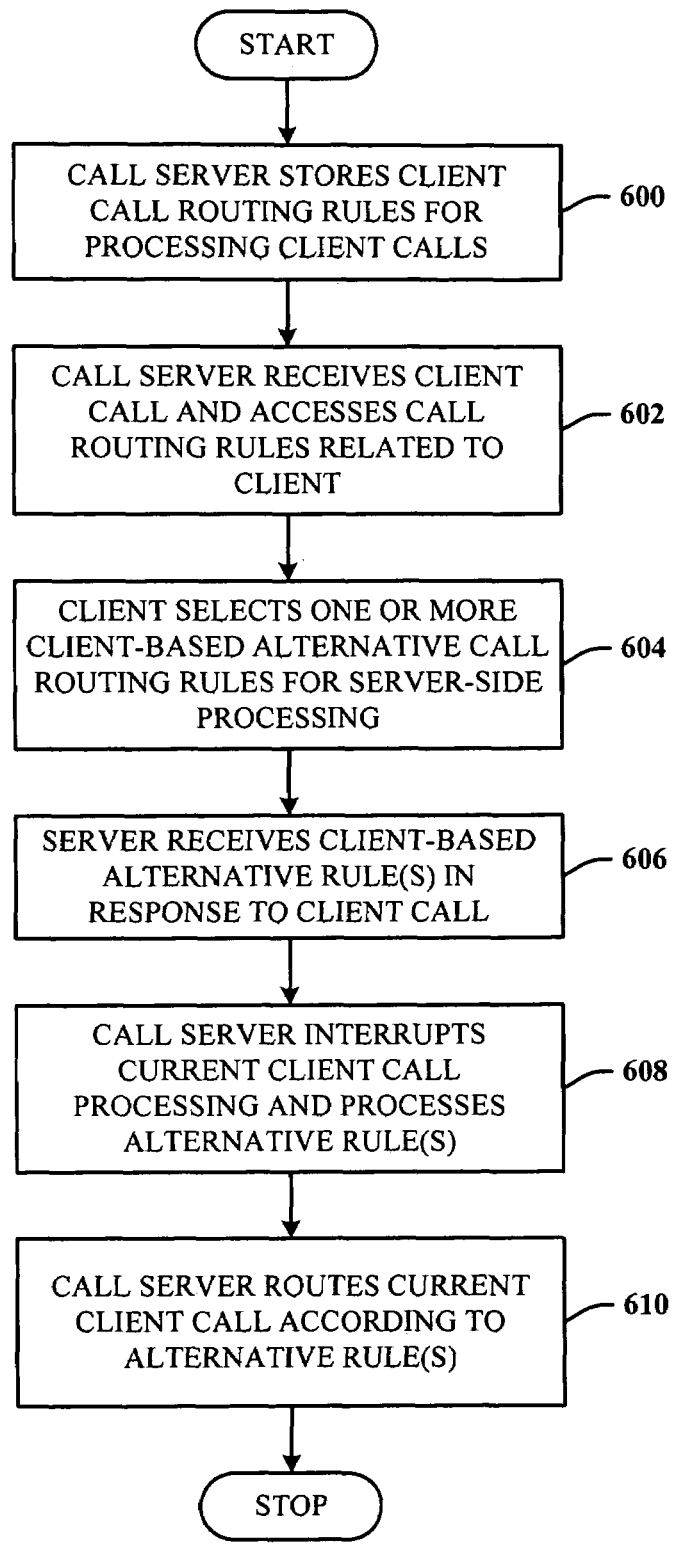
FIG. 6 illustrates a methodology of server-side processing based on client-side rules.

Referring now to FIG. 6, there, is illustrated a methodology of server-side processing based on client-side rules. At 600, a call server stores client call routing rules for normal processing of client calls. The rules can be for processing incoming calls and for processing client-originated calls. At 602, the server receives a client-terminated call and accesses the normal processing routing rules for that client. At 604, the client selects one or more client-based alternative call routing rules for server-side processing. At 606, the server receives the client-based alternative rule(s) in response to being signaled about the incoming client call. At 608, the call server interrupts normal handling of the incoming call and processes the alternative rule(s). At 610, the server routes the current call according to the alternative rule(s).

Figure 7:
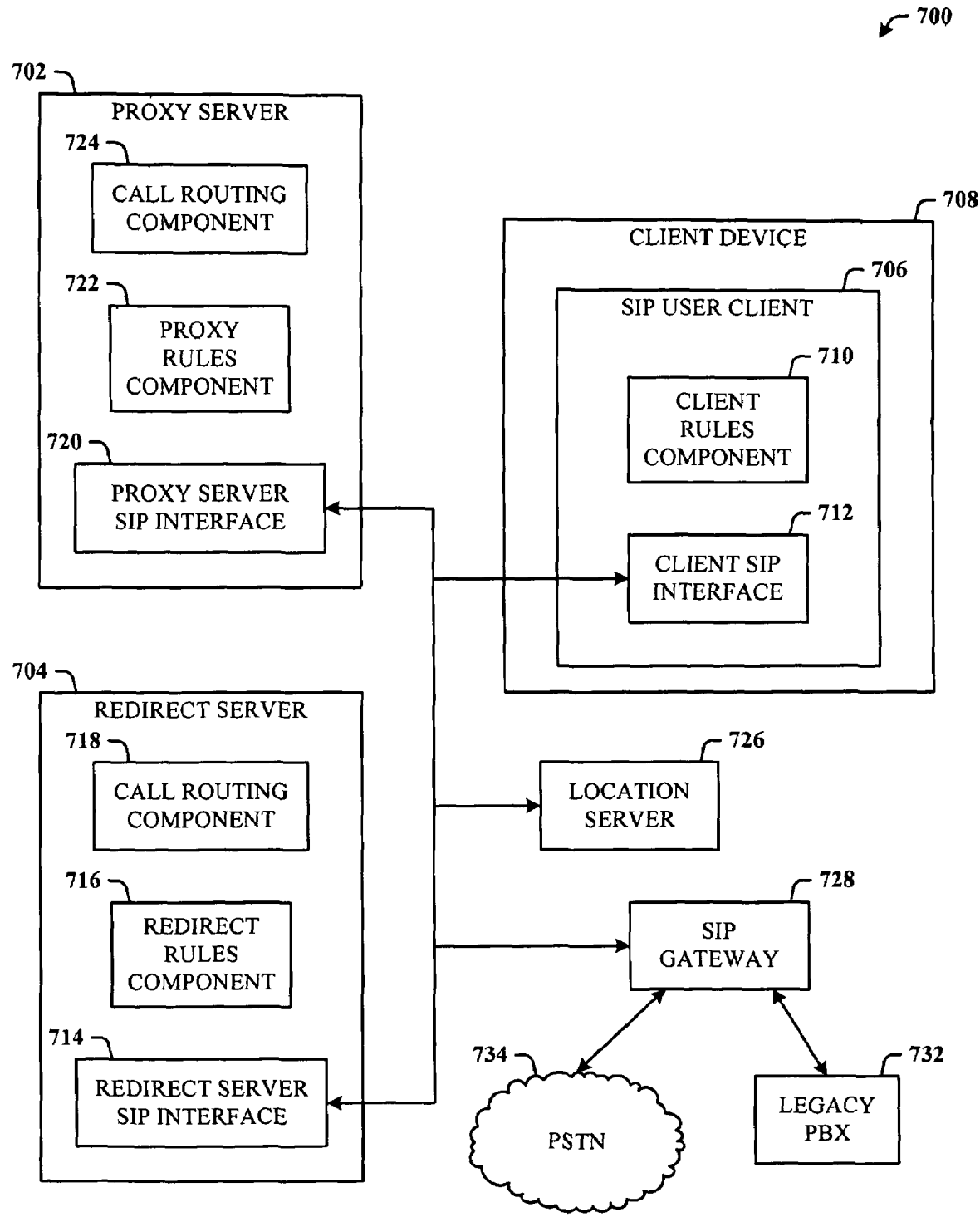
FIG. 7 illustrates a SIP client-based call forwarding system.

FIG. 7 illustrates a SIP client-based call forwarding system 700. The system 700 includes a proxy server 702, a redirect server 704 and a SIP user client 706 of a client (wired or wireless) device 708. The SIP client 706 of the device 708 can include a client rules component 710 for creating rules on the client for transmission via a client SIP interface 712 to and execution by the proxy server 702 and/or the redirect server 704. As shown, the client rules component 710 and the client SIP interface 712 are part of the SIP user client 706. However, this is not a requirement, in that either or both of the client rules component 710 or/and client SIP interface 712 can be components external to the SIP user client 706 of the device 708.

The proxy server 702 is an intermediate network entity that receives SIP requests from a client (e.g., client 706) and forwards the request on the client's behalf. In other words, the proxy server 702 receives SIP messages and forwards the messages to the next SIP server of the network. The proxy server 702 can provide authentication, authorization, network access control, routing, request retransmission, and security functions.

The redirect server 704 provides the client with information about the next hop (or hops) that the message should take. Thereafter, the client contacts the next hop entity (or server) directly. A registrar server (not shown) processes requests the client 706 for registration of the client's current location. Note that a registrar server can be co-located with the proxy server 702 or the redirect server 704. As the client device moves, its location can be dynamically registered with a SIP server.

When a SIP redirect code is utilized in a rule created at the client device 708, the client SIP interface 712 communicates the SIP redirection response to a redirect server SIP interface 714 of the redirect server 704. The redirect server 704 can include a redirect rules component 716 for processing the redirect response, and a redirect call routing component 718 that facilitates routing of the call according to the received client rule(s).

When a SIP informational response is utilized in a rule created by the client 706, the client SIP interface communicates the rule to a proxy server SIP interface 720. The proxy server 702 can include a proxy rules component 722 for processing the informational response, and a proxy call routing component 724 that facilitates routing of the call according to the received client rule(s).

The SIP servers (702 and 704), can interact with other services such as LDAP (lightweight directory access protocol), location servers (e.g., a location server 726), a database application, and an XML (extensible markup language) application. These application services can provide back-end services such as directory, authentication, and billing services. Note also that phones can function as a server or a client.

Calls can be initiated by the client device 708 and routed through a SIP gateway 728 to a legacy PBX (private branch exchange), for example, and/or the PSTN (public switched telephone network). The gateway 728 provides call control, translation between conferencing endpoints, audio/video codecs, performs call setup and clearing on both the IP network side and the switched circuit side.

Figure 8:
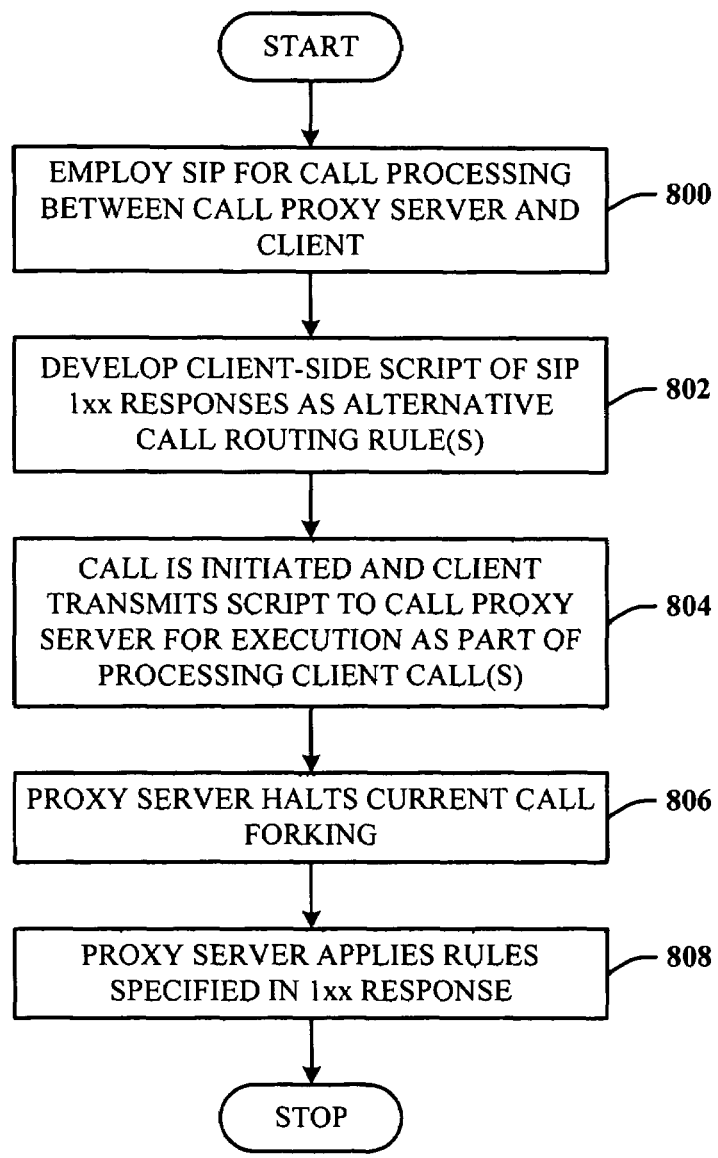
FIG. 8 illustrates a methodology of client-side control using a SIP proxy server.

FIG. 8 illustrates a methodology of client-side control using a SIP proxy server. At 800, SIP is employed for call processing between a call proxy server and a client. At 802, a client-side script of SIP informational responses (1xx) is developed as alternative rules for server-side processing. At 804, a call is initiated (either client-originated or client-terminated) and the client transmits the script to the proxy server for execution as part of processing a client call. At 806, the proxy server halts current call forking for the client call. At 808, the proxy server applies the rule(s) specified as the 1xx message(s) to the current call.

Figure 9:
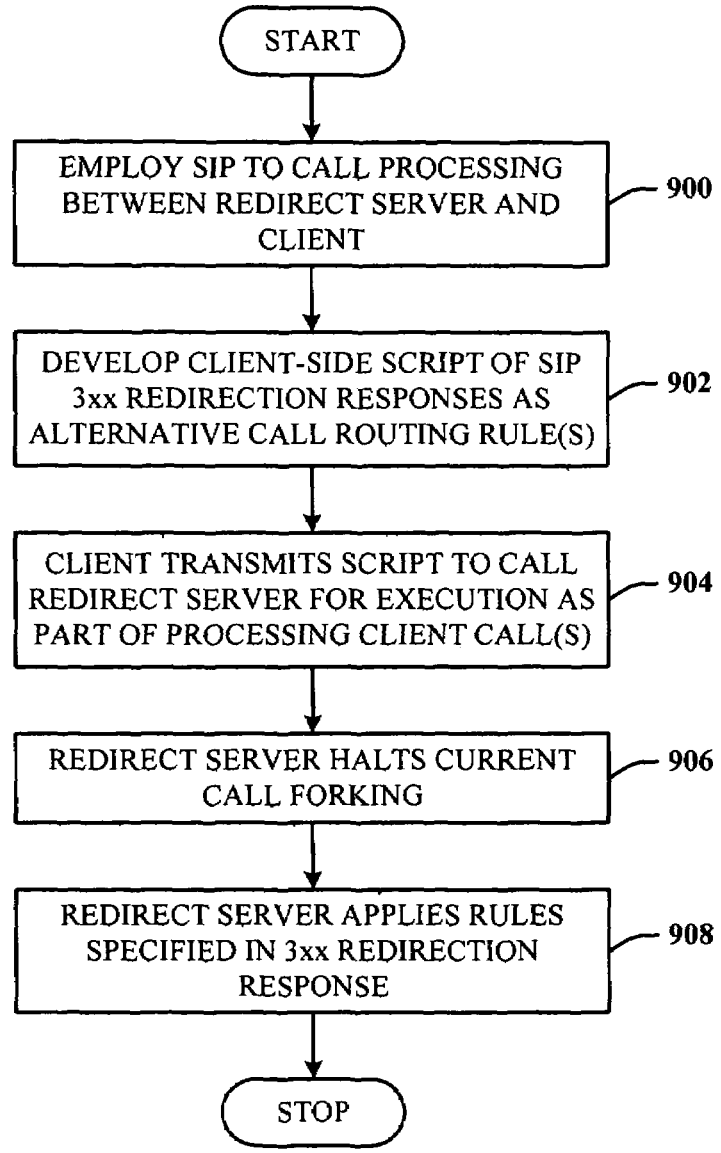
FIG. 9 illustrates a methodology of client-side control using a SIP redirect server.

FIG. 9 illustrates a methodology of client-side control using a SIP redirect server. At 900, SIP is employed for call processing between a client and a redirect server. At 902, a client-side script is created of one or more redirection responses as alternative call routing rules. At 904, a call is initiated (either client-originated or client terminated) and the client transmits the script to the redirect server for processing instead of normally processing rules stored on the server and used for client calls. At 906, the redirect server halts any current call forking related to that client. At 908, the redirect server executes the script of rules and processes the call accordingly.

Figure 10:
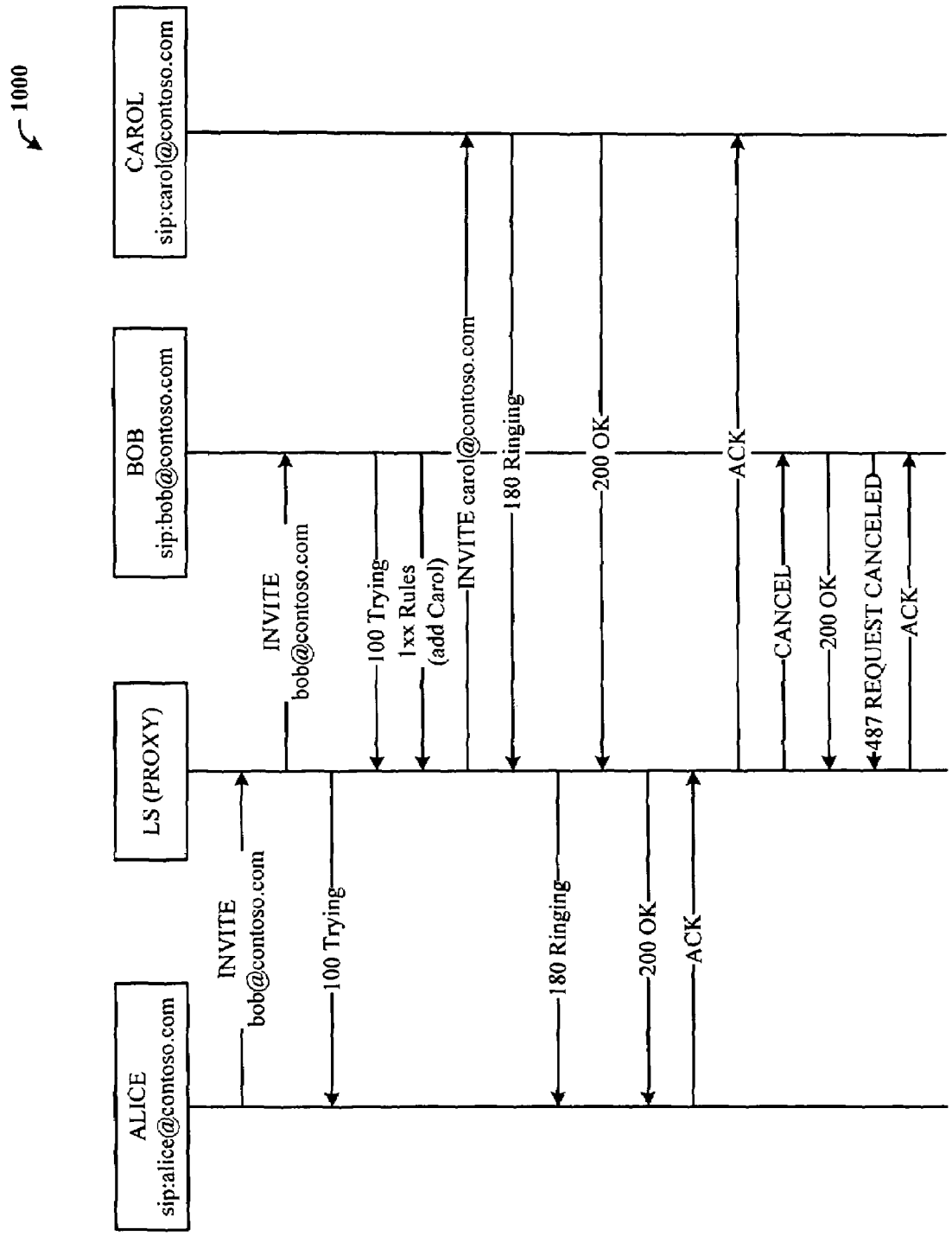
FIG. 10 illustrates an exemplary call flow diagram for client control by ringing other contacts that are currently online.

FIG. 10 illustrates an exemplary call flow diagram for client control by ringing other contacts that are currently online. The example is between parties Alice and Bob, where Alice calls Bob. Alice has a SIP address of sip: alicec@contoso.com, where the format is sip: userID@gateway.com. Alice's client sends a SIP INVITE request to the proxy server, the proxy server determines the path to the callee Bob, the path being the SIP address sip: bob@contoso.com, and forwards the INVITE request to Bob. The server sends a message back to Alice's client to indicate to Alice that the call is being attempted. Bob's client responds with a 100 TRYING response back to the proxy server.

Bob has created and stored a rule set on his client to ring other contacts that are currently online. Carol is online, and Bob's client sends a provisional response (denoted 1xx Rules) to the proxy server (e.g., a location server) indicating to the proxy server to add Carol to the call. The proxy server locates Carol's SIP address and initiates a SIP INVITE to Carol's address of carol@contoso.com. Carol's client responds with a 180 RINGING response to the proxy server. The server forwards the ringing signal back to Alice's client. Alice's client also sends a 200 OK successful response back to the proxy server, which forwards it to Alice's client. Alice's client sends an acknowledgment (denoted ACK) to the proxy, which forwards the ACK to Carol's client. At some point, Bob decides to drop out of the multiparty call. Accordingly, a CANCEL message is sent from the proxy server to Bob's client, with the client responding with a SIP 200 OK message. Bob's client sends a 487 Request Cancelled to the proxy server, and the server responds with an ACK.

The 1xx provisional response (e.g., a 199 response) indicated above can have a flexible script, for example, an XML script that contains the details of how the call needs to be routed. The 1xx responses are helpful in instances when other users have to be added to the call, without stopping the current device from ringing. Some examples are presented below. Note that the XML is only for illustrative purposes, as other languages can be employed.

The client includes software that facilitates creation of scripts by the client user. Following is exemplary XML code script for adding another caller to an existing call.

SIP/2.0 1xx Rules
To: Bob <sip:bob@contoso.com>;tag=76786
From: Alice <sip:alice@contoso.com>;tag=98908
Call-ID:
Contact:

```
CSeq: 7778 INVITE
Content-Type: application/ms-callproc-rules+xml
Content-Length: 142
<ms-call-proc>
<add>
    <location uri=carol@contoso.com />
</add>
</ms-call-proc>
```

Following is exemplary XML code for adding a team of Carol and Dan to an existing call.

```
SIP/2.0 1xx Rules
To: Bob <sip:bob@contoso.com>;tag=76786
From: Alice <sip:alice@contoso.com>;tag=98908
Call-ID:
Contact:
CSeq: 7778 INVITE
Content-Type: application/ms-callproc-rules+xml
Content-Length: 142
<ms-call-proc>
<add>
    <location uri=carol@contoso.com />
    <location uri=dan@contoso.com />
</add>
</ms-call-proc>
```

Following is exemplary XML code for sending to a team for ten seconds and then redirecting to voicemail or no answer.

```
SIP/2.0 1xx Rules
To: Bob <sip:bob@contoso.com>;tag=76786
From: Alice <sip:alice@contoso.com>;tag=98908
Call-ID:
Contact:
CSeq: 7778 INVITE
Content-Type: application/ms-callproc-rules+xml
Content-Length: 142
<ms-call-proc>
<add wait=10 no-answer=voicemail>
    <location uri=carol@contoso.com />
    <location uri=dan@contoso.com />
</add>
</ms-call-proc>
```

Figure 11:
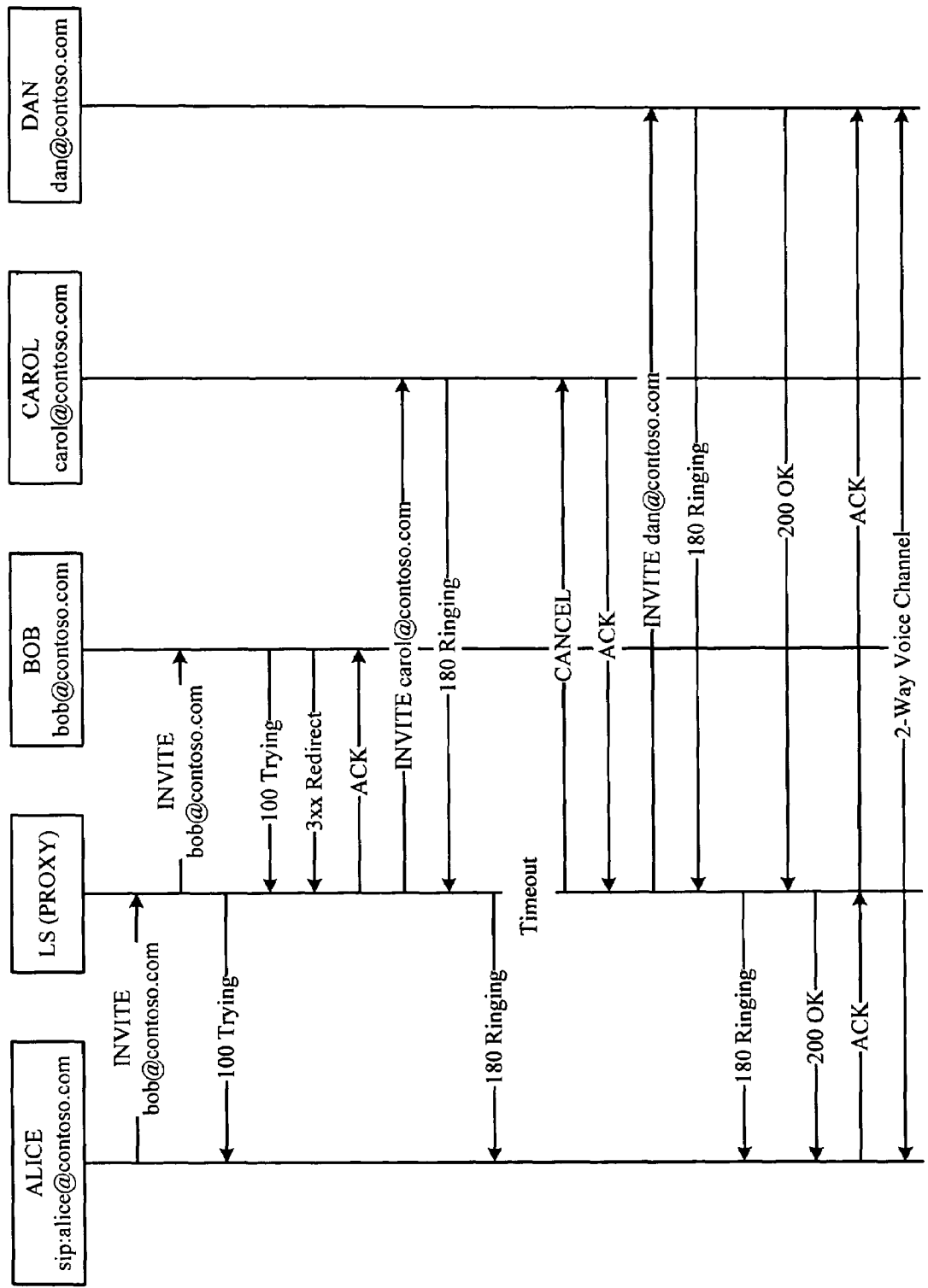
FIG. 11 illustrates an exemplary call flow diagram using 3xx redirection to divert a call.

FIG. 11 illustrates an exemplary call flow diagram using 3xx redirection to divert a call. The following call flow diagram is an example where a 3xx response (e.g. 399) is used to divert the call. The 3xx responses are useful to indicate to the server to reroute the call based on the rules specified by the client. A 3xx response essentially stops ringing the client and applies the forwarding rules specified.

In the call flow diagram, Bob has set a dynamic call forwarding rule to forward the call to Carol first for five seconds, disconnects Carol, and then connects to Dan. Alice calls Bob and the call rings Carol first, before ringing Dan.

Alice's client sends a SIP INVITE request that includes Bob's address of bob@contoso.com to the proxy server, the proxy server determines the path to the callee Bob, and forwards the INVITE request to Bob. The server sends a message back to Alice's client to indicate to Alice that the call is being attempted. Bob's client responds with a 100 TRYING response back to the proxy server. Bob's client sends the redirect rule (3xx) to the proxy server. The server responds to Bob's client with an ACK.

Carol is online, and the proxy server sends a SIP INVITE request to Carol's client, which client responds to the server with a 180 RINGING message. The server forwards the ringing signal on to Alice's client. At that point, a timeout of five seconds occurs, followed by a CANCEL message to Carol's client. Carol's client responds to the server with and ACK.

The server then sends a SIP INVITE to Dan's client, which responds with a 180 RINGING message to the server, and on to the Alice's client. Dan's client sends a 200 OK message to the server, which is forwarded to Alice's client. Alice's client then sends an ACK to the server for forwarding on the Dan's client. A two-way voice channel is then established between Dan and Alice.

Following is exemplary XML code where a 3xx message is used in the redirect of a call.

```
SIP/2.0 3xx Apply Rules
To: Bob <sip:bob@contoso.com>;tag=76786
From: Alice <sip:alice@contoso.com>;tag=98908
Call-ID:
Contact:
CSeq: 7778 INVITE
Content-Type: application/ms-callproc-rules+xml
Content-Length: 142
<ms-call-proc>
<retarget wait=5>
    <location uri=carol@contoso.com />
    <location uri=dan@contoso.com />
</retarget>
<retarget wait=5 noanswer=voicemail>
    <location uri=dan@contoso.com />
</retarget>
</ms-call-proc>
```

Figure 12:
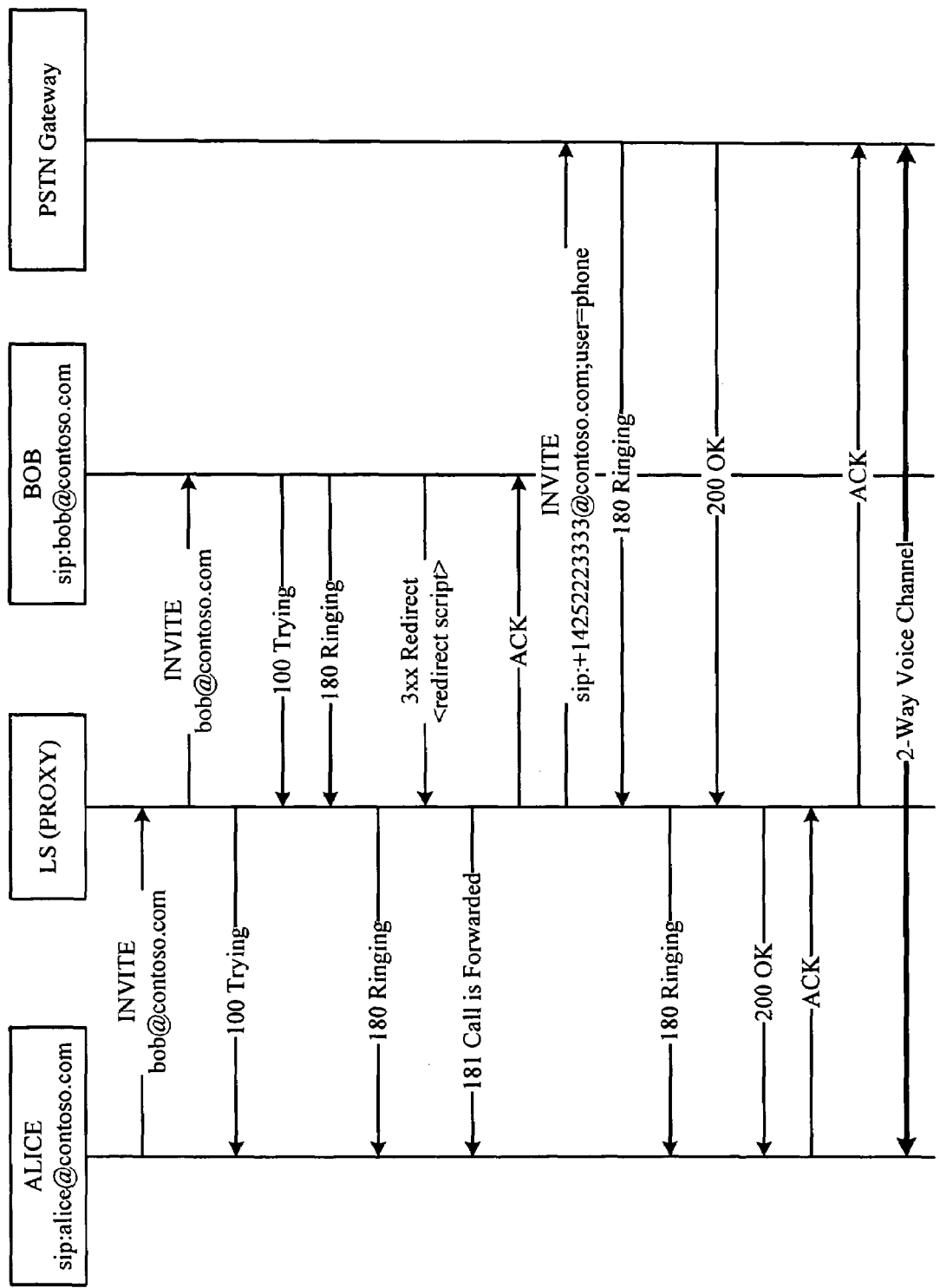
FIG. 12 illustrates an exemplary call flow diagram for redirecting a call to a PSTN destination.

FIG. 12 illustrates an exemplary call flow diagram for redirecting a call to a PSTN destination. Alice's client sends a SIP INVITE request to the proxy server, the proxy server determines the path to the callee Bob, the path being the SIP address sip:bob@contoso.com, and forwards the INVITE request to Bob. The server sends a message back to Alice's client to indicate to Alice that the call is being attempted. Bob's client responds with a 100 TRYING response back to the proxy server, as well as a SIP 180 RINGING message. The server forwards the 180 RINGING message to Alice's client.

Bob has created and stored a rule set on his client to redirect the call. Accordingly, a SIP 3xx REDIRECT message using a redirect script is sent from Bob's client to the server. The server then sends a SIP 181 CALL IS FORWARDED message to Alice's client. The server sends an ACK to Bob's client, and an INVITE message to the PSTN gateway having the address stipulated in Bob's redirect message. The gateway responds by sending a 180 RINGING message to the server, which is forwarded to Alice's client. A SIP 200 OK message is also sent from the gateway to the server and on to Alice's client. Alice's client sends an ACK to the server, which forwards the ACK to the gateway. A 2-way voice channel is then established between Alice's client and the PSTN gateway.

Figure 13:
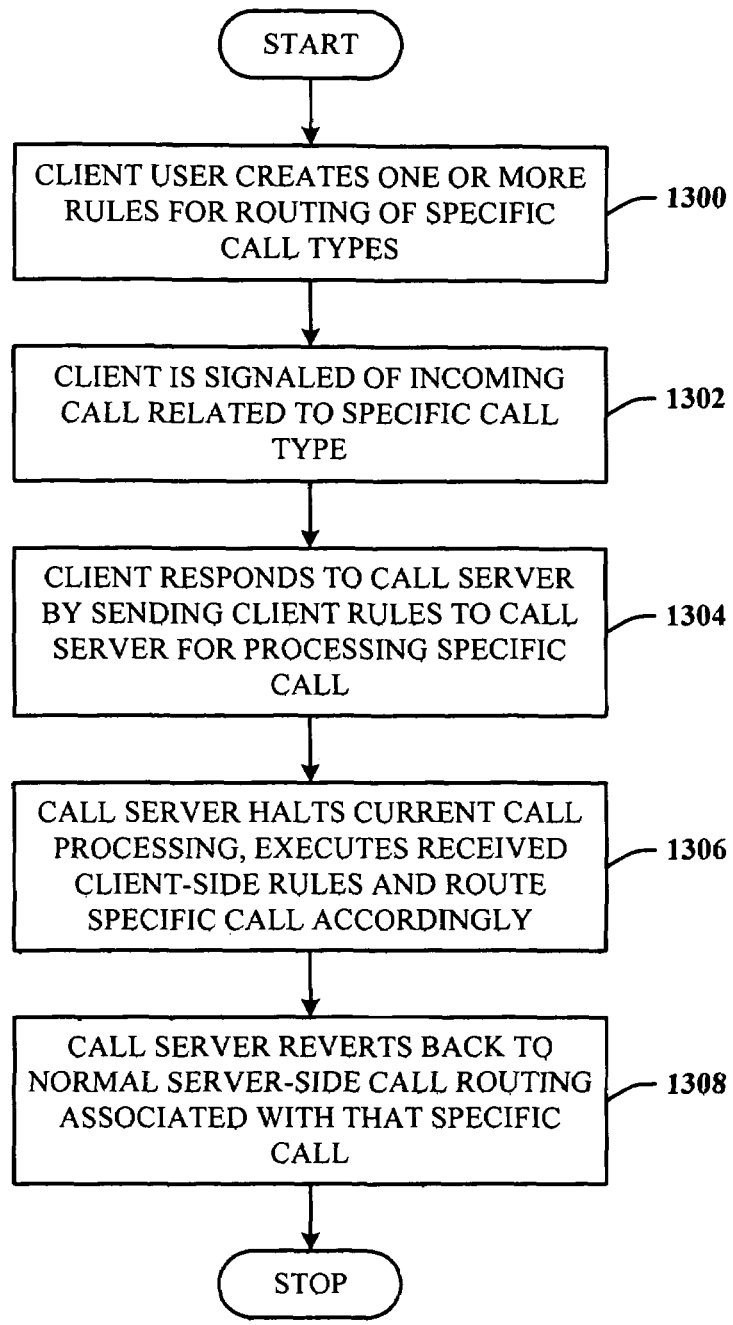
FIG. 13 illustrates a methodology of dynamically managing calls for various accounts by using client-side control of a call server.

Following are methodologies of examples where conventional server-side call processing can benefit from the disclosed client-side call forwarding control. FIG. 13 illustrates a methodology of dynamically managing calls for various accounts by using client-side control of a call server. Here, a client device includes a CRM (customer relationship management) application that provides user account information. The user can create rules at the client that allows the client user to dynamically allow calls from certain accounts to be directed to certain other destinations (e.g., redirect incoming call related to bank account information to be routed to a PSTN-terminated home telephone handset). At 1300, the client user creates one or more rules on the client for routing of specific call types. At 1302, the client is signaled of an incoming call related to one of the specific call types. At 1304, the client responds to the server by sending client rules to the call server for processing the specific call type. At 1306, the call server halts current call processing related to the incoming call, executes the received client-side rule(s), and routes the specific call type accordingly. At 1308, the call server reverts back to normal server-side call routing associated with that specific call.

Figure 14:
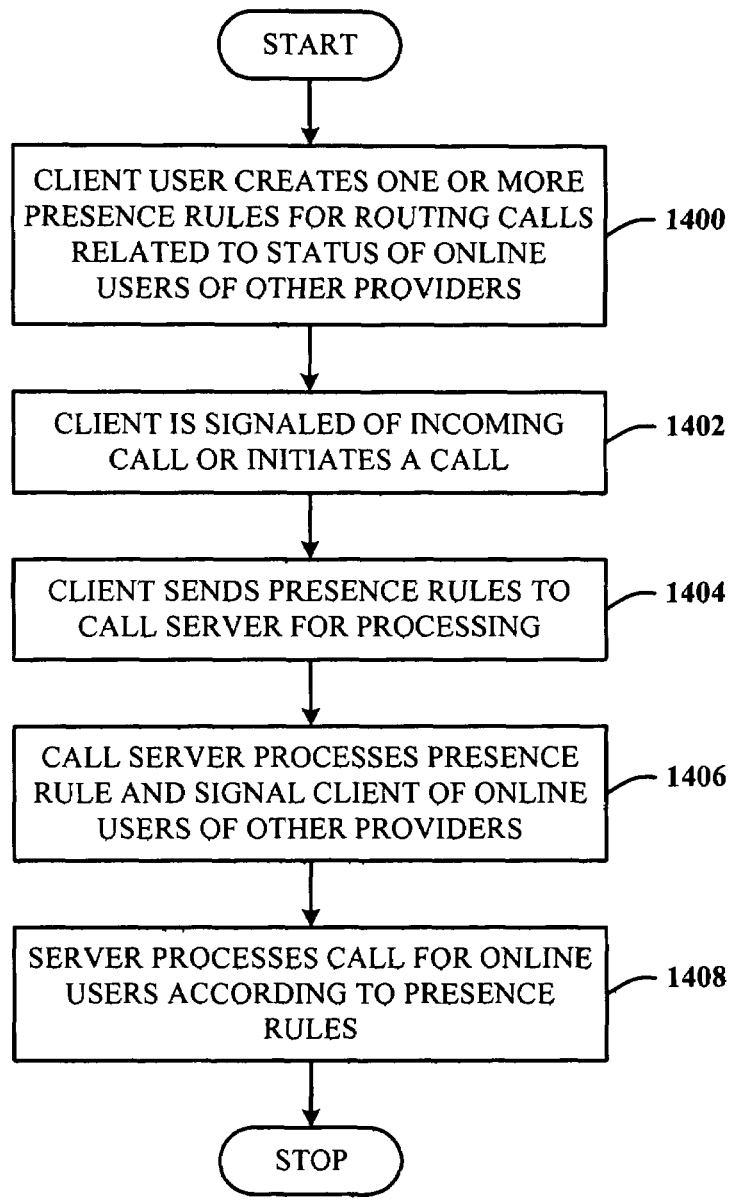
FIG. 14 illustrates a methodology of managing presence information at the client by using client-side control of a call server.

FIG. 14 illustrates a methodology of managing presence information at the client by using client-side control of a call server. Here, a client device includes a presence-based application that aggregates presence information from other third party presence providers. Thus, the client-side rules can be created and transmitted for execution by the call server to allow incoming calls to be directed to people whose status on those other providers is online. At 1400, the client user creates one or more presence rules for routing calls related to the status of online users of other providers. At 1402, the client is signaled of an incoming call or initiates an outgoing call. At 1404, the client sends the presence rules to the call server for processing. At 1406, the caller receives and processes the presence rules and signals the client of the rules results, which can be whether a user of another provider is online or offline. At 1408, the call server processes the call for online users according to the presence rules. This can include signaling the online users for connection to the current call (e.g., call conferencing).

Figure 15:
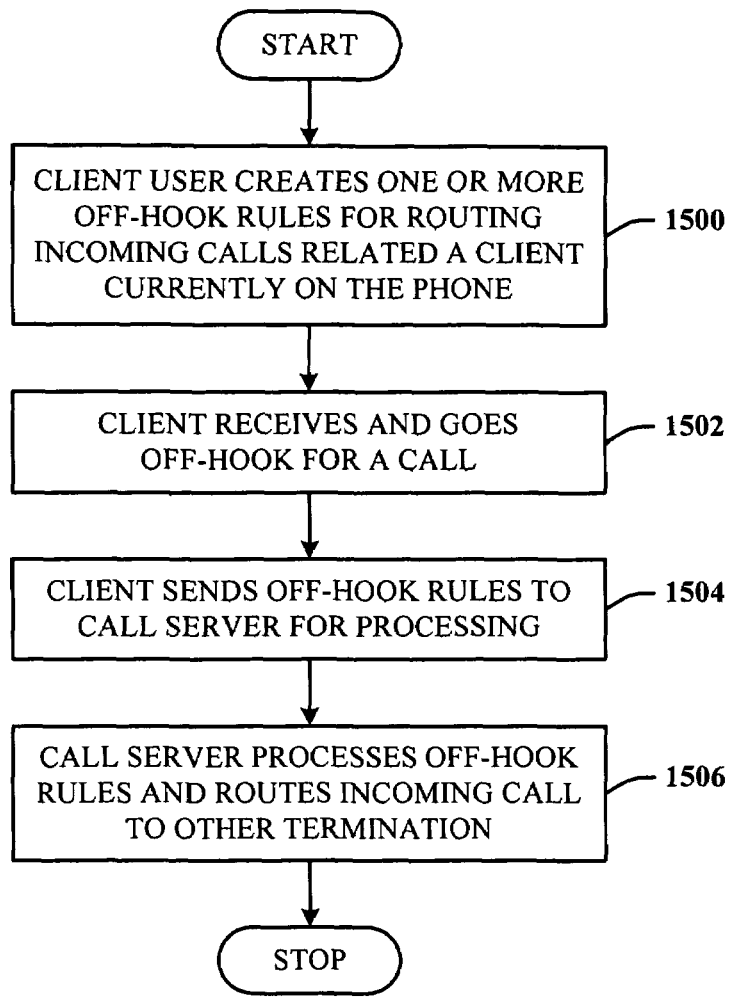
FIG. 15 illustrates a methodology of managing incoming calls to an off-hook (or online) client by using client-side control of a call server.

FIG. 15 illustrates a methodology of managing incoming calls to an off-hook (or online) client by using client-side control of a call server. Here, a client device facilitates user creation of rules that introduce various "states" such as "Do Not Disturb—only when in Meeting with Manager". The call server need not be aware of who the user is currently talking to, and in accordance with the innovative client-based call forwarding capability, the client can route the incoming calls intelligently to an assistant or someone else. At 1500, a client user creates one or more off-hook rules on the client for routing incoming calls when the user is currently on the phone. At 1502, the client receives a call and goes off-hook. At 1504, the client responds by sending the off-hook rules to the call server for processing. At 1506, the call server processes the off-hook rules and routes the incoming calls to other terminations. The rules can also include providing signaling to the client device that lets the off-hook user know who is attempting to call in. Thus, a brief text message can be displayed, a brief audio tone played, short video clip played, etc., any of which can be customized for the particular caller.

Figure 16:
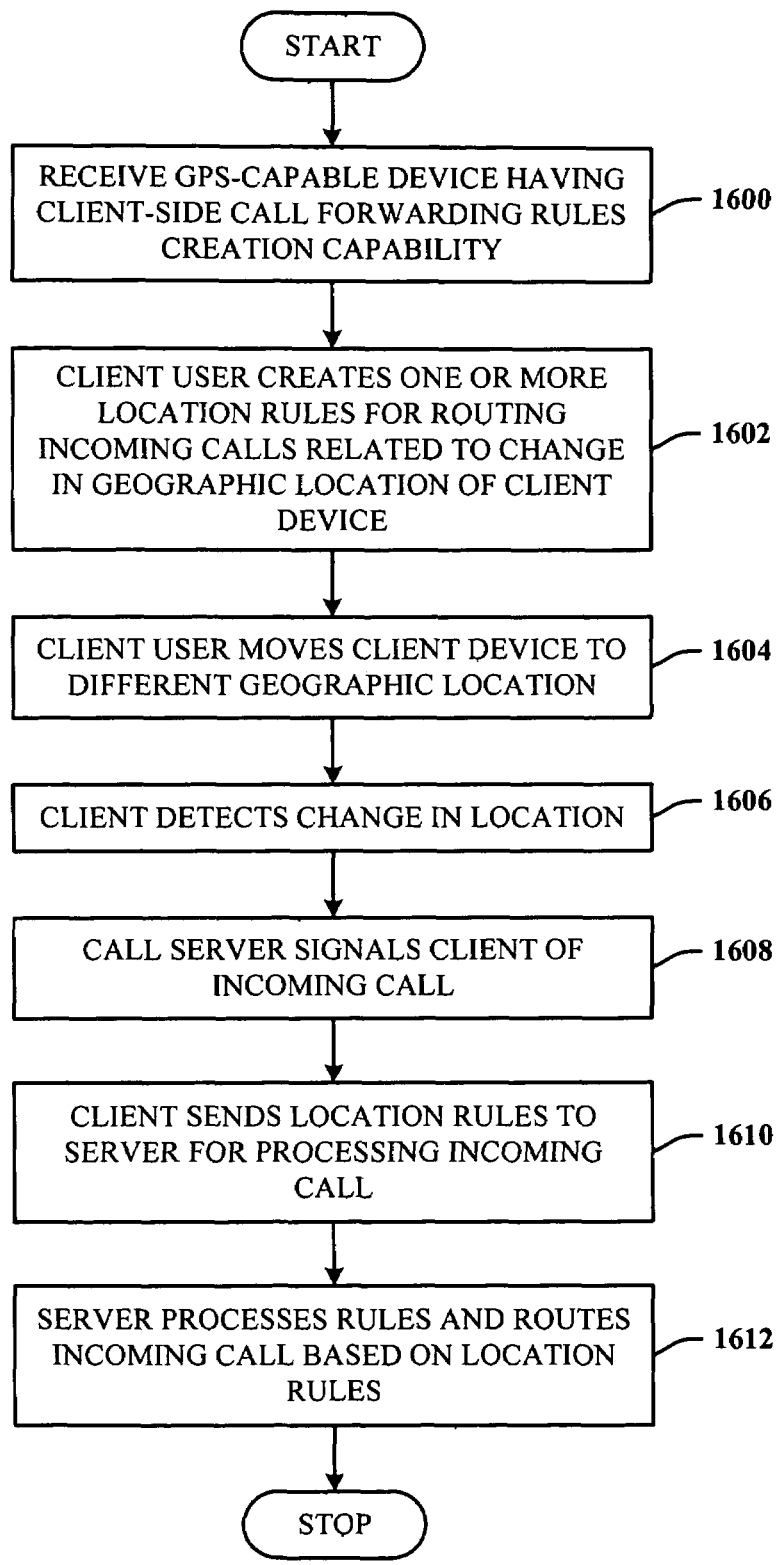
FIG. 16 illustrates a methodology of dynamically managing calls based on changes in client location by using client-side control of a call server processing.

FIG. 16 illustrates a methodology of dynamically managing calls based on changes in client location by using client-side control of a call server processing. For example, the state of the client can change frequently such that the server may not be aware of this state; therefore, the call processing rules on the server may not be applicable. One example includes a client of a mobile device equipped with a GPS (global positioning system) receiver. The user can take the mobile device to various parts of the country, and in accordance with the innovative client-based call forwarding capability, the user has programmed the device to route calls appropriately based on the current location of the user. For example, a rule can be "When I am at work, ring my work phone; when I am in Alabama, ring my mobile device."

At 1600, a client device is received that includes GPS capability and client-side rules creation capability. At 1602, the client user creates one or more location rules for routing incoming calls related to change in geographic location of the client device. At 1604, the client user moves the client device to a different geographic location. At 1606, the client detects a change in location of the device. This can occur by the device having the capability to receive and periodically process the GPS data to make this determination. At 1608, the call server signals the client of an incoming call. At 1610, the client responds by sending to the call server the location rules for server-side processing of the location rules. At 1612, the server processes the rules and routes the incoming call accordingly.

As used in this application, the terms "component" and "system" are intended to refer to a computer-related entity, either hardware, a combination of hardware and software, software, or software in execution. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

Figure 17:
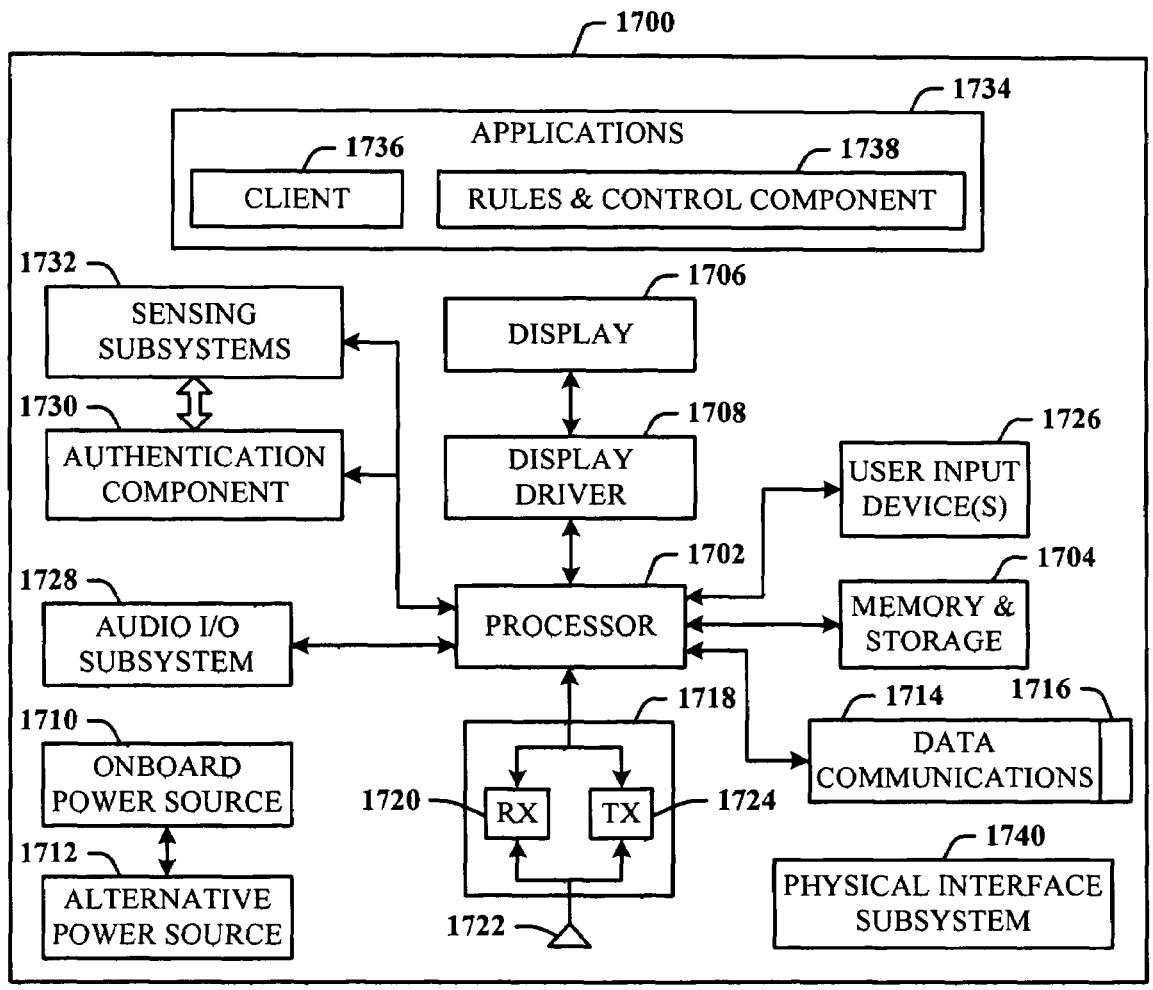
FIG. 17 illustrates a schematic block diagram of a portable wireless device that facilitates client-side rules creation and call server control.

FIG. 17 illustrates a schematic block diagram of a portable wireless device (PWD) 1700 (e.g., a cell phone, portable computer, tablet PC) that facilitates client-side rules creation and call server control. The device 1700 includes a processor 1702 that interfaces to one or more internal components for control and processing of data and instructions. The processor 1702 can be programmed to control and operate the various components within the device 1700 in order to carry out the various functions described herein. The processor 1702 can be any of a plurality of suitable processors (e.g., a DSP—digital signal processor), and can be a multiprocessor subsystem.

A memory and storage component 1704 interfaces to the processor 1702 and serves to store program code, and also serves as a storage means for information such as data, applications, services, metadata, device states, and the like. The memory and storage component 1704 can include non-volatile memory suitably adapted to store at least a complete set of the sensed input data that is acquired from the sensing subsystem and/or sensors. Thus, the memory 1704 can include RAM or flash memory for high-speed access by the processor 1702 and/or a mass storage memory, e.g., a micro drive capable of storing gigabytes of data that comprises text, images, audio, and/or video content. According to one aspect, the memory 1704 has sufficient storage capacity to store multiple sets of information relating to disparate services, and the processor 1702 can include a program that facilitates alternating or cycling between various sets of information corresponding to the disparate services.

A display 1706 can be coupled to the processor 1702 via a display driver subsystem 1708. The display 1706 can be a color liquid crystal display (LCD), plasma display, touch screen display, or the like. The display 1706 functions to present data, graphics, or other information content. Additionally, the display 1706 can present a variety of functions that are user selectable and that provide control and configuration of the device 1700. In a touch screen example, the display 1706 can display touch selectable icons that facilitate user interaction for control and/or configuration.

Power can be provided to the processor 1702 and other onboard components forming the device 1700 by an onboard power system 1710 (e.g., a battery pack or fuel cell). In the event that the power system 1710 fails or becomes disconnected from the device 1700, an alternative power source 1712 can be employed to provide power to the processor 1702 and other components (e.g., sensors, image capture device, . . . ) and to charge the onboard power system 1710, if a chargeable technology. For example, the alternative power source 1712 can facilitate interface to an external a grid connection via a power converter. The processor 1702 can be configured to provide power management services to, for example, induce a sleep mode that reduces the current draw, or to initiate an orderly shutdown of the device 1700 upon detection of an anticipated power failure.

The device 1700 includes a data communications subsystem 1714 having a data communications port 1716, which port 1716 is employed to interface the device 1700 to a remote computing system, server, service, or the like. The port 1716 can include one or more serial interfaces such as a Universal Serial Bus (USB) and/or IEEE 1794 that provide serial communications capabilities. Other technologies can also be included, but are not limited to, for example, infrared communications utilizing an infrared communications port, and wireless packet communications (e.g., Bluetooth™, Wi-Fi, and Wi-Max). If a smartphone, the data communications subsystem 1714 can include SIM (subscriber identity module) data and the information necessary for cellular registration and network communications.

The device 1700 can also include a radio frequency (RF) transceiver section 1718 in operative communication with the processor 1702. The RF section 1718 includes an RF receiver 1720, which receives RF signals from a remote device or system via an antenna 1722 and can demodulate the signal to obtain digital information modulated therein. The RF section 1718 also includes an RF transmitter 1724 for transmitting information (e.g., data, service(s)) to a remote device or system, for example, in response to manual user input via a user input device 1726 (e.g., a keypad), or automatically in response to detection of entering and/or anticipation of leaving a communication range or other predetermined and programmed criteria.

The device 1700 can also include an audio I/O subsystem 1728 that is controlled by the processor 1702 and processes voice input from a microphone or similar audio input device (not shown). The audio subsystem 1728 also facilitates the presentation of speech and audio output signals via a speaker or similar audio output device (not shown).

The device 1700 can also include an authentication component 1730 that interfaces to the processor, and facilitates authentication of a user to the device itself and/or to a remote system. The processor 1702 also interfaces to a sensing subsystems block 1732 that facilitates the capture and input of the OCR data, voice data, handwriting data, and image/video data, for example, for determination of user context and/or concept. Additionally, the device 1700 includes one or more applications 1734 (e.g., imaging program, video presentation program, OCR program, search engine, . . . ) that can be launched to enable operation of the sensing systems for receiving sensed input data in accordance with the innovative architecture. In accordance with the subject innovation, the applications 1734 can include a client 1736 that facilitates session protocol communications with a proxy and/or redirect server for call routing management. In support of rules creation and control, the applications 1734 can also include a rules and control component 1738. The device user can then create rules of one or more session responses (e.g., SIP responses) for communication to the servers to control call forwarding in response to receiving a call and/or during a call, whether client originated to client terminated.

The device 1700 can also include a physical interface subsystem 1740 that allows direct physical connection to another system (e.g., via a connector), rather than by wireless communications or cabled communications therebetween.

Figure 18:
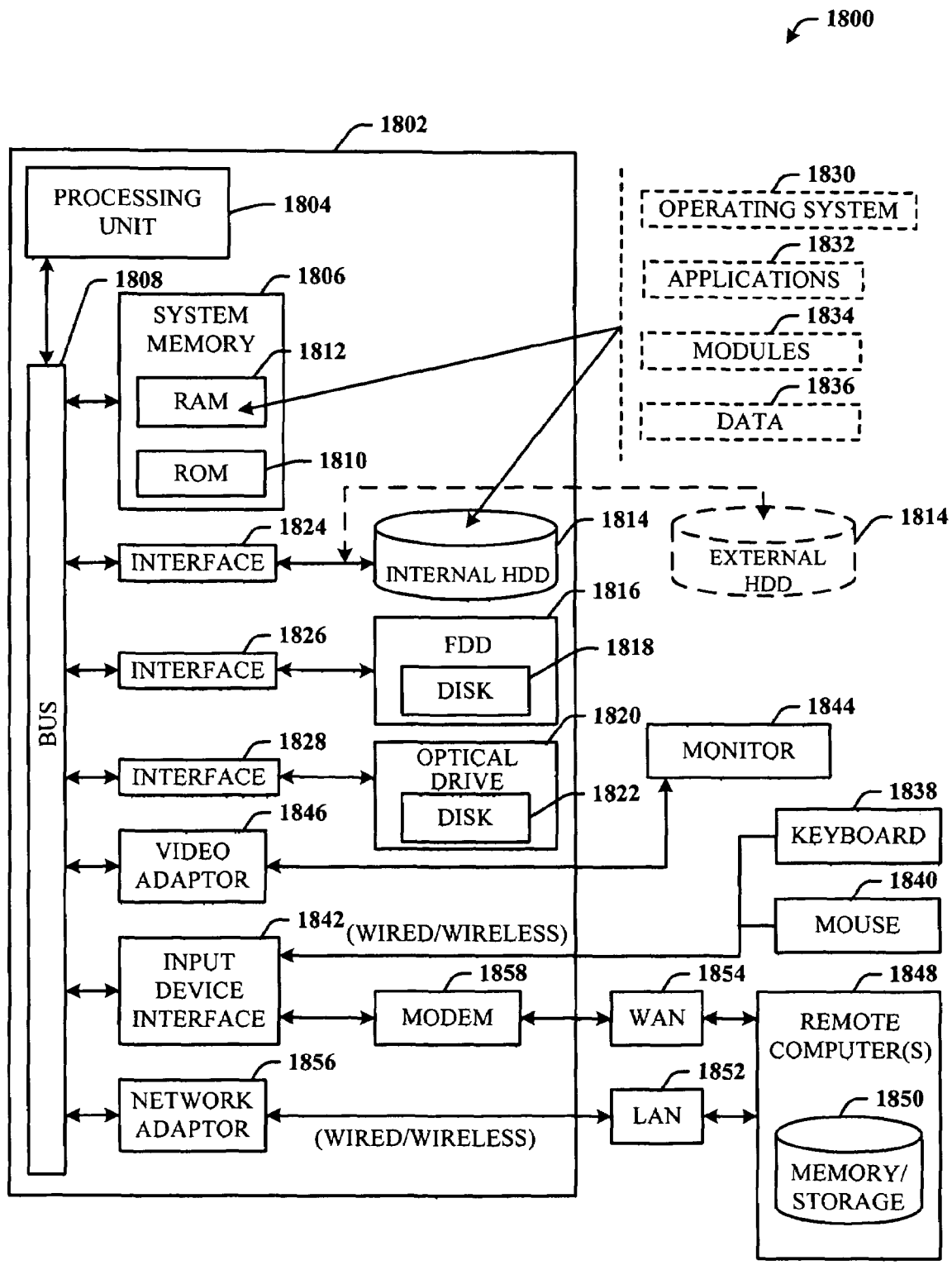
FIG. 18 illustrates a block diagram of a desktop or portable computer operable to execute client-side call forwarding control of a call server in accordance with the disclosed architecture.

Referring now to FIG. 18, there is illustrated a block diagram of a desktop or portable computer operable to execute client-side call forwarding control of a call server in accordance with the disclosed architecture. In order to provide additional context for various aspects thereof, FIG. 18 and the following discussion are intended to provide a brief, general description of a suitable computing environment 1800 in which the various aspects of the innovation can be implemented. While the description above is in the general context of computer-executable instructions that may run on one or more computers, those skilled in the art will recognize that the innovation also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and non-volatile media, removable and non-removable media. By way of example, and not limitation, computer-readable media can comprise computer storage media and communication media. Computer storage media includes both volatile and non-volatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

With reference again to FIG. 18, the exemplary environment 1800 for implementing various aspects includes a computer 1802, the computer 1802 including a processing unit 1804, a system memory 1806 and a system bus 1808. The system bus 1808 couples system components including, but not limited to, the system memory 1806 to the processing unit 1804. The processing unit 1804 can be any of various commercially available processors. Dual microprocessors and other multi-processor architectures may also be employed as the processing unit 1804.

The system bus 1808 can be any of several types of bus structure that may further interconnect to a memory bus (with or without a memory controller), a peripheral bus, and a local bus using any of a variety of commercially available bus architectures. The system memory 1806 includes read-only memory (ROM) 1810 and random access memory (RAM)

1812. A basic input/output system (BIOS) is stored in a non-volatile memory 1810 such as ROM, EPROM, EEPROM, which BIOS contains the basic routines that help to transfer information between elements within the computer 1802, such as during start-up. The RAM 1812 can also include a high-speed RAM such as static RAM for caching data.

The computer 1802 further includes an internal hard disk drive (HDD) 1814 (e.g., EIDE, SATA), which internal hard disk drive 1814 may also be configured for external use in a suitable chassis (not shown), a magnetic floppy disk drive (FDD) 1816, (e.g., to read from or write to a removable diskette 1818) and an optical disk drive 1820, (e.g., reading a CD-ROM disk 1822 or to read from or write to other high capacity optical media such as the DVD). The hard disk drive 1814, magnetic disk drive 1816 and optical disk drive 1820 can be connected to the system bus 1808 by a hard disk drive interface 1824, a magnetic disk drive interface 1826 and an optical drive interface 1828, respectively. The interface 1824 for external drive implementations includes at least one or both of Universal Serial Bus (USB) and IEEE 1394 interface technologies. Other external drive connection technologies are within contemplation of the subject innovation.

The drives and their associated computer-readable media provide nonvolatile storage of data, data structures, computer-executable instructions, and so forth. For the computer 1802, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the disclosed innovation.

A number of program modules can be stored in the drives and RAM 1812, including an operating system 1830, one or more application programs 1832, other program modules 1834 and program data 1836. All or portions of the operating system, applications, modules, and/or data can also be cached in the RAM 1812. It is to be appreciated that the innovation can be implemented with various commercially available operating systems or combinations of operating systems.

A user can enter commands and information into the computer 1802 through one or more wired/wireless input devices, for example, a keyboard 1838 and a pointing device, such as a mouse 1840. Other input devices (not shown) may include a microphone, an IR remote control, a joystick, a game pad, a stylus pen, touch screen, or the like. These and other input devices are often connected to the processing unit 1804 through an input device interface 1842 that is coupled to the system bus 1808, but can be connected by other interfaces, such as a parallel port, an IEEE 1394 serial port, a game port, a USB port, an IR interface, etc.

A monitor 1844 or other type of display device is also connected to the system bus 1808 via an interface, such as a video adapter 1846. In addition to the monitor 1844, a computer typically includes other peripheral output devices (not shown), such as speakers, printers, etc.

The computer 1802 may operate in a networked environment using logical connections via wired and/or wireless communications to one or more remote computers, such as a remote computer(s) 1848. The remote computer(s) 1848 can be a workstation, a server computer, a router, a personal computer, portable computer, microprocessor-based entertainment appliance, a peer device or other common network node, and typically includes many or all of the elements described relative to the computer 1802, although, for purposes of brevity, only a memory/storage device 1850 is illustrated. The logical connections depicted include wired/wireless connectivity to a local area network (LAN) 1852 and/or larger networks, for example, a wide area network (WAN) 1854. Such LAN and WAN networking environments are commonplace in offices and companies, and facilitate enterprise-wide computer networks, such as intranets, all of which may connect to a global communications network, for example, the Internet.

When used in a LAN networking environment, the computer 1802 is connected to the local network 1852 through a wired and/or wireless communication network interface or adapter 1856. The adaptor 1856 may facilitate wired or wireless communication to the LAN 1852, which may also include a wireless access point disposed thereon for communicating with the wireless adaptor 1856.

When used in a WAN networking environment, the computer 1802 can include a modem 1858, or is connected to a communications server on the WAN 1854, or has other means for establishing communications over the WAN 1854, such as by way of the Internet. The modem 1858, which can be internal or external and a wired or wireless device, is connected to the system bus 1808 via the serial port interface 1842. In a networked environment, program modules depicted relative to the computer 1802, or portions thereof, can be stored in the remote memory/storage device 1850. It will be appreciated that the network connections shown are exemplary and other means of establishing a communications link between the computers can be used.

The computer 1802 is operable to communicate with any wireless devices or entities operatively disposed in wireless communication, for example, a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, for example, computers, to send and receive data indoors and out; anywhere within the range of a base station. Wi-Fi networks use radio technologies called IEEE 802.11x (a, b, g, etc.) to provide secure, reliable, fast wireless connectivity. A Wi-Fi network can be used to connect computers to each other, to the Internet, and to wired networks (which use IEEE 802.3 or Ethernet).

Wi-Fi networks can operate in the unlicensed 2.4 and 5 GHz radio bands. IEEE 802.11 applies to generally to wireless LANs and provides 1 or 2 Mbps transmission in the 2.4 GHz band using either frequency hopping spread spectrum (FHSS) or direct sequence spread spectrum (DSSS). IEEE 802.11a is an extension to IEEE 802.11 that applies to wireless LANs and provides up to 54 Mbps in the 5 GHz band. IEEE 802.11a uses an orthogonal frequency division multiplexing (OFDM) encoding scheme rather than FHSS or DSSS. IEEE 802.11b (also referred to as 802.11 High Rate DSSS or Wi-Fi) is an extension to 802.11 that applies to wireless LANs and provides 11 Mbps transmission (with a fallback to 5.5, 2 and 1 Mbps) in the 2.4 GHz band. IEEE 802.11g applies to wireless LANs and provides 20+ Mbps in the 2.4 GHz band. Products can contain more than one band (e.g., dual band), so the networks can provide real-world performance similar to the basic 10BaseT wired Ethernet networks used in many offices.

What has been described above includes examples of the disclosed innovation. It is, of course, not possible to describe every conceivable combination of components and/or methodologies, but one of ordinary skill in the art may recognize that many further combinations and permutations are possible. Accordingly, the innovation is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. An apparatus, comprising:
a client rules component operative to enable a client portable communication device to create one or more call routing rules to route calls of the client portable communication device;
a storage component operative to store the one or more call routing rules at the client portable communication device; and
a control component operative to retrieve a call routing rule from the storage component for an in-process call of the client portable communication device, and send the call routing rule from the client portable communication device to a call server handling routing of the in-process call of the client portable communication device that interrupts and overrides a current call routing rule being applied to the in-process call of the client portable communication device by the call server handling routing of the in-process call of the client portable communication device;
the control component further operative to expose session protocol messages for user access, and wherein the user creates a client-side script to route the in-process call of the client portable communication device upon execution, the client-side script sent from the client portable communication device to the call server handling routing of the in-process call of the client portable communication device.

2. The apparatus of claim 1, the control component further operative to send one or more messages of a session protocol to the call server handling routing of the in-process call of the client portable communication device, to control the routing of the in-process call of the client portable communication device.

3. The apparatus of claim 2, the session protocol comprising a session initiation protocol (SIP).

4. The apparatus of claim 3, wherein a provisional response message of the SIP includes a call forwarding rule to route the in-process call of the client portable communication device upon execution of the call forwarding rule, the call forwarding rule sent from the client portable communication device to the call server handling routing of the in-process call of the client portable communication device.

5. The apparatus of claim 3, wherein a redirection response message of the SIP includes a call forwarding rule to route the in-process call of the client portable communication device upon execution, the call forwarding rule sent from the client portable communication device to the call server handling routing of the in-process call of the client portable communication device.

6. The apparatus of claim 3, the control component further operative to facilitate routing of the in-process call of the client portable communication device using at least one of 1xx and 3xx SIP responses.

7. The apparatus of claim 1, the control component further operative to facilitate controlling routing of the in-process call of the client portable communication device by the call server handling routing of the in-process call of the client portable communication device while concurrently processing signaling and messaging at the client.

8. A computer-implemented method, comprising:
developing at a client portable communication device a call forwarding rule operative to process and route calls of the client portable communication device;
storing the call forwarding rule at the client portable communication device;
receiving a signal at the client portable communication device indicating that a call of the client portable communication device has been received for processing by a call server handling routing of the received call of the client portable communication device;
sending the call forwarding rule from the client portable communication device to the call server handling routing of the received call of the client portable communication device, while the received call is in-process, that causes the call server to interrupt and override a current call routing rule being applied to the in-process call of the client portable communication device;
creating a script at the client portable device, the script including one or more of SIP provisional response messages and SIP redirect response messages, the script operative to route the in-process call of the client portable communication device; and
transmitting the script to the call server handling routing of the in-process call of the client portable communication device for execution in response to receiving the in-process call of the client portable communication device.

9. The computer-implemented method of claim 8, comprising dynamically signaling the call server handling routing of the call of the client portable communication device from the client portable communication device to forward the call of the client portable communication device when the call of the client portable communication device is received.

10. The computer-implemented method of claim 8, the call forwarding rule comprising a presence rule operative to route calls of the client portable communication device based on a detected presence of one or more other online clients.

11. The computer-implemented method of claim 8, the call forwarding rule comprising a location rule operative to route calls of the client portable communication device based on a detected change in geographic location of the client portable communication device.

12. The computer-implemented method of claim 8, the call forwarding rule comprising a SIP message operative to route the call of the client portable communication device at the server upon execution of the SIP message.

13. The computer-implemented method of claim 8, the call forwarding rule comprising a call type rule operative to route calls of the client portable communication device based on a detected call type.

14. The computer-implemented method of claim 8, the call forwarding rule operative to connect multiple different call parties to the call of the client portable communication device.

15. The computer-implemented method of claim 8, the call forwarding rule operative to dynamically terminate the call of the client portable communication device at another device while the client portable communication device is currently processing another call.

16. The computer-implemented method of claim 8, comprising sending the call forwarding rule to the call server handling routing of the call of the client portable communication device in response to receiving the call of the call portable communication device, which is a public switched telephone network (PSTN)-based call, the call forwarding rule further operative to route the call of the client portable communication device to a mobile phone.

17. A call management system for a client wireless device, comprising:
   means for creating, at a client wireless device, a call routing rule to route calls of the client wireless device;
   means for storing the call routing rule at the client wireless device;
   means for receiving a signal at the client wireless device indicating that a call of the client wireless device has been received for processing by a call server handling routing of the call of the client wireless device;
   means for sending the call routing rule from the client wireless device to the call server handling routing of the call of the client wireless device, while the call is in-process, that interrupts and overrides a current call routing rule being applied to the in-process call of the client wireless device by the call server handling routing of the call of the client wireless device;
   means for creating a script at the client wireless device, the script including one or more of SIP provisional response messages and SIP redirect response messages, the script operative to route the in-process call of the client wireless device; and
   means for transmitting the script to the call server handling routing of the in-process call of the client wireless device for execution in response to receiving the in-process call of the client wireless device.

* * * * *